(12) United States Patent
Muñoz De La Torre Alonso et al.

(10) Patent No.: US 11,979,927 B2
(45) Date of Patent: May 7, 2024

(54) REGISTERING AND CONFIGURING A NETWORK FUNCTION FOR SELECTIVELY ROUTING UPLINK DATA TRAFFIC

(71) Applicant: Telefonaktiebolaget LM Ericsson (publ), Stockholm (SE)

(72) Inventors: Miguel Angel Muñoz De La Torre Alonso, Madrid (ES); Aldo Bolle, Västra Frölunda (SE); Miguel Angel Puente Pestaña, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 290 days.

(21) Appl. No.: 17/764,222

(22) PCT Filed: Sep. 3, 2020

(86) PCT No.: PCT/EP2020/074668
§ 371 (c)(1),
(2) Date: Mar. 28, 2022

(87) PCT Pub. No.: WO2021/063625
PCT Pub. Date: Apr. 8, 2021

(65) Prior Publication Data
US 2022/0377645 A1 Nov. 24, 2022

(30) Foreign Application Priority Data
Oct. 2, 2019 (EP) .................................... 19382847

(51) Int. Cl.
*H04W 8/00* (2009.01)
*H04W 8/18* (2009.01)
(Continued)

(52) U.S. Cl.
CPC ........... *H04W 76/12* (2018.02); *H04W 8/005* (2013.01); *H04W 8/18* (2013.01);
(Continued)

(58) Field of Classification Search
CPC ... H04L 41/02–5096; H04L 43/02–55; H04W 8/005–30; H04W 24/02–10;
(Continued)

(56) References Cited

U.S. PATENT DOCUMENTS

2019/0394833 A1* 12/2019 Talebi Fard .......... H04W 76/12

OTHER PUBLICATIONS

"3rd Generation Partnership Project; Technical Specification Group Services and System Aspects; System Architecture for the 5G System (5GS); Stage 2 (Release 15)", 3GPP TS 23.501 V.15.7.0, Sep. 2019, 243 pages (Year: 2019).*

(Continued)

*Primary Examiner* — Timothy J Weidner
(74) *Attorney, Agent, or Firm* — Murphy, Bilak & Homiller, PLLC

(57) ABSTRACT

An aspect provides a method by user plane function (UPF) in a core network (CN) of a communication network for registering the UPF at a network repository function (NRF) of the CN. The UPF is to selectively route uplink data traffic in one or more data sessions from a user equipment (UE) to one of a plurality of session anchor network functions (NFs). The method by the UPF comprises sending (1701) a registration request to the NRF. The registration request comprises registration information comprising an indication of a type of filter supported by the UPF to selectively route uplink data traffic from a UE to a particular session anchor NF. The type of filter relates to an application identity; and an indication of a value for the indicated type of filter.

25 Claims, 18 Drawing Sheets

(51) Int. Cl.
  *H04W 28/02* (2009.01)
  *H04W 28/088* (2023.01)
  *H04W 28/12* (2009.01)
  *H04W 40/12* (2009.01)
  *H04W 40/24* (2009.01)
  *H04W 40/30* (2009.01)
  *H04W 76/11* (2018.01)
  *H04W 76/12* (2018.01)
  *H04W 76/22* (2018.01)
  *H04W 84/02* (2009.01)
  *H04W 88/18* (2009.01)
  *H04W 92/02* (2009.01)

(52) U.S. Cl.
  CPC ..... *H04W 28/0247* (2013.01); *H04W 28/088* (2023.05); *H04W 28/12* (2013.01); *H04W 40/12* (2013.01); *H04W 40/248* (2013.01); *H04W 40/30* (2013.01); *H04W 76/11* (2018.02); *H04W 76/22* (2018.02); *H04W 84/02* (2013.01); *H04W 88/18* (2013.01); *H04W 92/02* (2013.01)

(58) Field of Classification Search
  CPC ........... H04W 28/02–26; H04W 36/0005–385; H04W 40/005–38; H04W 60/005–06; H04W 76/10–50; H04W 84/02–16; H04W 88/005–188; H04W 92/02–24
  See application file for complete search history.

(56) References Cited

OTHER PUBLICATIONS

"3rd Generation Partnership Project; Technical Specification Group Core Network and Terminals; 5G System; Network Function Repository Services; Stage 3 (Release 16)", 3GPP TS 29.510 V16.1.0, Sep. 2019, 150 pages.

"3rd Generation Partnership Project; Technical Specification Group Services and System Aspects; Procedures for the 5G System (5GS); Stage 2 (Release 16)", 3GPP TS 23.502 V16.2.0, Sep. 2019, 525 pages.

"3rd Generation Partnership Project; Technical Specification Group Services and System Aspects; System Architecture for the 5G System (5GS); Stage 2 (Release 15)", 3GPP TS 23.501 V.15.7.0, Sep. 2019, 243 pages.

* cited by examiner

REGISTERING AND CONFIGURING A NETWORK FUNCTION FOR SELECTIVELY ROUTING UPLINK DATA TRAFFIC

TECHNICAL FIELD

Embodiments described herein relate to methods and apparatus for registering and configuring a network function that is for selectively routing uplink data traffic.

BACKGROUND

The 3$^{rd}$ Generation Partnership Project (3GPP) is currently standardising the 5G Core (5GC) network as part of the overall 5G System architecture. Prior to 3GPP Release 15 (Rel-15), the functional distribution within the core network (CN) was based on Network Elements exchanging messages over point to point interfaces. With Rel-15 5G, to facilitate cloud native implementations and deployments, a Service-Based Architecture (SBA) has been introduced, based on the concept of Network Functions (NF) offering and consuming NF Services over Service Based Interfaces (SBIs). A service-based Network Function (NF) interaction with other network functions can be characterised by:

- The NF registers in a Network Repository Function (NRF) the list of supported NF services.
- Other NFs can discover the NF services using the NRF and select a specific instance of the NF.
- The NFs consume NF services of the selected NF instance.

Some of the interfaces between the NFs have been kept as point to point interfaces, such as the N4 interface between a Session Management Function (SMF) and a User Plane Function (UPF).

FIG. 1 illustrates a 5G system reference architecture 101 showing service-based interfaces used within the Control Plane (CP). It will be appreciated that not all NFs are depicted. Service-based interfaces are represented in the format Nxyz and point to point interfaces in the format Nx. The reference architecture 101 comprises a Network Slice Selection Function (NSSF) 102 that has a Nnssf interface, a Network Exposure Function (NEF) 103 that has a Nnef interface, a NRF 104 that has a Nnrf interface, a Policy Control Function (PCF) 105 that has a Npcf interface, a Unified Data Management (UDM) 106 that has a Nudm interface, an Application Function (AF) 107 that has a Naf interface, an Authentication Server Function (AUF) 108 that has a Nausf interface, an Access and Mobility Management Function (AMF) 109 that has a Namf interface and a SMF 110 that has a Nsmf interface.

The NRF 104 is a key NF within the 5GC SBA Framework that provides registration and discovery capabilities among the different NFs within the 5GC. In short, when a given NF (e.g. UDM type) registers a NF profile in the NRF 104, other NFs may discover it automatically by simply querying the NRF 104 to find NFs of a given type (e.g. UDM type).

The AMF 109 has an N1 interface to a user equipment (UE) 112, and an N2 interface to an access network (AN) 113 (which can be a radio AN, RAN). The SMF 110 has an N4 interface to a User Plane Function (UPF) 114. The interface between the R(AN) 113 and the UPF 114 is the N3 interface, and the interface between the UPF 114 and an Data Network 115 is the N6 interface.

FIG. 2 shows the 3GPP 5GC architecture 201 for policy, charging and analytics. This architecture includes a Unified Data Repository (UDR) 202 that has a Nudr interface, the NEF 203, a Network Data Analytics Function (NWDAF) 204 that has a Nnwdaf interface, the AF 205, the PCF 206, a Charging Function (CHF) 207 that has a Nchf interface, the AMF 208, the SMF 209 and the UPF 210. As with FIG. 1, it will be appreciated that not all NFs are depicted.

In order to support the distribution of the point of interconnect to DN for data flows with special requirements (e.g. low latency connectivity), a UPF known as an uplink classifier (ULCL) UPF may be combined with several Protocol Data Unit (PDU) Session Anchor UPFs as illustrated in FIG. 3. The main functionality of the ULCL is to route the traffic between the (R)AN and UPFs (session anchors) accordingly. It can also carry out other actions such as aggregated bit rate enforcements, volume reporting, etc. As specified in 3GPP, a ULCL is a type of UPF connected to SMF via a N4 interface.

Thus, in FIG. 3, an AMF 301 and SMF 302 are shown (which are interconnected by an N11 interface), along with a UE 303, an AN 304 and an ULCL UPF 305. The interface between the ULCL UPF 305 and the AN 304 is the N3 interface. There is a first PDU session anchor 306 associated with DN 307 and a second PDU session anchor 308 associated with DN 309. The ULCL UPF 305 is connected to both PDU session anchors 306, 308 by an N9 interface. The SMF 302 has an N4 interface with each of the ULCL UPF 305 and the two PDU session anchors 306, 308. As with FIG. 1, it will be appreciated that not all NFs are depicted.

SUMMARY

According to some embodiments, there is provided a method by a first network function, NF, in a core network, CN, of a communication network for registering the first NF at a network repository function, NRF, of the CN, wherein the first NF is to selectively route uplink data traffic in one or more data sessions from a user equipment, UE, to one of a plurality of session anchor NFs. The method by the first NF comprises: sending a registration request to the NRF, wherein the registration request comprises registration information comprising: an indication of a type of filter supported by the first NF to selectively route uplink data traffic from a UE to a particular session anchor NF; and an indication of a value for the indicated type of filter.

According to some embodiments, there is provided a method by a network repository function, NRF, in a core network, CN, of a communication network for registering a first network function, NF, that is to selectively route uplink data traffic in one or more data sessions from a user equipment, UE, to one of a plurality of session anchor NFs. The method by the NRF comprises: receiving a registration request from the first NF, wherein the registration request comprises registration information comprising: an indication of a type of filter supported by the first NF to selectively route uplink data traffic from a UE to a particular session anchor NF; and an indication of a value for the indicated type of filter.

According to some embodiments, there is provided a method by a session management function, SMF, in a core network, CN, of a communication network for associating with a first network function, NF, that is to selectively route uplink data traffic in one or more data sessions from a user equipment, UE, to one of a plurality of session anchor NFs. The method by the SMF comprises: receiving an association request from the first NF to associate the first NF with the SMF, wherein the association request comprises association information comprising: an indication of a type of filter supported by the first NF to selectively route uplink data traffic from a UE to a particular session anchor NF; and an indication of a value for the indicated type of filter.

According to some embodiments, there is provided a method by a first network function, NF, in a core network, CN, of a communication network for configuring the first NF, wherein the first NF is to selectively route uplink data traffic in one or more data sessions from a user equipment, UE, to one of a plurality of session anchor NFs. The method by the first NF comprises: receiving a control request from another NF in the CN, wherein the control request comprises control information that comprises: an indication of a type of filter to be used by the first NF to selectively route uplink data traffic from a UE to a particular session anchor NF; and an indication of a value for the indicated type of filter.

According to some embodiments, there is provided a method by a session management function, SMF, in a core network, CN, of a communication network for configuring a first network function, NF, that is to selectively route uplink data traffic in one or more data sessions from a user equipment, UE, to one of a plurality of session anchor NFs. The method by the SMF comprises: receiving a traffic management request from a network exposure function, NEF, in the CN, wherein the traffic management request comprises traffic management information comprising: an indication of a type of filter to be used by the first NF to selectively route uplink data traffic from a UE to a particular session anchor NF; and an indication of a value for the indicated type of filter; and sending a control request to the first NF, wherein the control request comprises control information comprising: the indication of the type of filter to be used by the first NF to selectively route uplink data traffic from a UE to a particular session anchor NF; and the indication of the value for the indicated type of filter.

According to some embodiments, there is provided a method by a network repository function, NRF, in a core network, CN, of a communication network for configuring a first network function, NF, that is registered with the NRF, wherein the first NF is to selectively route uplink data traffic in one or more data sessions from a user equipment, UE, to one of a plurality of session anchor NFs. The method by the NRF comprises: receiving a NF discovery request from a network exposure function, NEF, in the CN that requests information about the first NF, wherein the NF discovery request comprises NF discovery information comprising: an indication of a type of filter supported by the first NF to selectively route uplink data traffic from a UE to a particular session anchor NF; and an indication of a value for the indicated type of filter; and sending, to the NEF, a response to the NF discovery request indicating the information about the first NF.

According to some embodiments, there is provided a method by a network exposure function, NEF, in a core network, CN, of a communication network for configuring a first network function, NF, wherein the first NF is to selectively route uplink data traffic in one or more data sessions from a user equipment, UE, to one of a plurality of session anchor NFs. The method by the NEF comprises: sending a NF discovery request to a network repository function, NRF, in the CN that requests information about the first NF, wherein the NF discovery request comprises NF discovery information comprising: an indication of a type of filter supported by the first NF to selectively route uplink data traffic from a UE to a particular session anchor NF; and an indication of a value for the indicated type of filter; receiving, from the NRF, a response to the NF discovery request indicating the information about the first NF; and sending a control request to another NF in the CN, wherein the control request comprises control information that comprises: the indication of the type of filter supported by the first NF to selectively route uplink data traffic from a UE to a particular session anchor NF; and the indication of the value for the indicated type of filter.

According to some embodiments, there is provided a method by an application function, AF, in a core network, CN, of a communication network for configuring a first network function, NF, wherein the first NF is to selectively route uplink data traffic in one or more data sessions from a user equipment, UE, to one of a plurality of session anchor NFs. The method by the AF comprises: sending a traffic influence request to a network exposure function, NEF, in the CN, wherein the traffic influence request comprises traffic influence information comprising: an indication of a type of filter supported by the first NF to selectively route uplink data traffic from a UE to a particular session anchor NF; and an indication of a value for the indicated type of filter; and receiving a response to the traffic influence request from the NEF.

According to some embodiments, there is provided a method by a first network function, NF, in a core network, CN, of a communication network for selectively routing uplink data traffic in one or more data sessions from a user equipment, UE, to one of a plurality of session anchor NFs. The method by the first NF comprises registering the first NF at a network repository function, NRF, of the CN according to any disclosed embodiment; configuring the first NF according to any disclosed embodiment; receiving data traffic from a UE via a radio access network, RAN, of the communication network; and using a filter according to indicated type having the indicated value to selectively route the received data traffic from the UE to a particular session anchor NF.

According to some embodiments, there is provided a method implemented in a communication network including a host computer, a user equipment, UE, a base station, a core network, CN, comprising a first network function, NF, for selectively routing uplink data traffic in one or more data sessions from UEs to one of a plurality of session anchor NFs. The method comprises: at the host computer, receiving data traffic transmitted from the UE via the base station, the first NF and a particular session anchor NF, wherein the first NF selectively routes the data traffic according to an indication of a type of filter to be used by the first NF and an indication of a value for the indicated type of filter.

According to some embodiments, there is provided a computer program product comprising a computer readable medium having computer readable code embodied therein, the computer readable code being configured such that, on execution by a suitable computer, processor or processing circuitry, the computer, processor or processing circuitry is caused to perform the method of any of the above method embodiments.

According to some embodiments, there is provided a first network function, NF, for use in a core network, CN, of a communication network, wherein the first NF is for registering at a network repository function, NRF, of the CN, wherein the first NF is to selectively route uplink data traffic in one or more data sessions from a user equipment, UE, to one of a plurality of session anchor NFs. The first NF either (i) is configured to, or (ii) comprises a processor and a memory, said memory containing instructions executable by said processor whereby said first NF is operative to: send a registration request to the NRF, wherein the registration request comprises registration information comprising: an indication of a type of filter supported by the first NF to selectively route uplink data traffic from a UE to a particular session anchor NF; and an indication of a value for the indicated type of filter.

According to some embodiments, there is provided a network repository function, NRF, for use in a core network, CN, of a communication network, wherein the NRF is for registering a first network function, NF, that is to selectively route uplink data traffic in in one or more data sessions from a user equipment, UE, to one of a plurality of session anchor NFs. The NRF either (i) is configured to, or (ii) comprises a processor and a memory, said memory containing instructions executable by said processor whereby said NRF is operative to: receive a registration request from the first NF, wherein the registration request comprises registration information comprising: an indication of a type of filter supported by the first NF to selectively route uplink data traffic from a UE to a particular session anchor NF; and an indication of a value for the indicated type of filter.

According to some embodiments, there is provided a session management function, SMF, for use in a core network, CN, of a communication network, wherein the SMF is for associating with a first network function, NF, that is to selectively route uplink data traffic in one or more data sessions from a user equipment, UE, to one of a plurality of session anchor NFs. The SMF either (i) is configured to, or (ii) comprises a processor and a memory, said memory containing instructions executable by said processor whereby said SMF is operative to: receive an association request from the first NF to associate the first NF with the SMF, wherein the association request comprises association information comprising: an indication of a type of filter supported by the first NF to selectively route uplink data traffic from a UE to a particular session anchor NF; and an indication of a value for the indicated type of filter.

According to some embodiments, there is provided a first network function, NF, for use in a core network, CN, of a communication network, wherein the first NF is to selectively route uplink data traffic in one or more data sessions from a user equipment, UE, to one of a plurality of session anchor NFs. The first NF either (i) is configured to, or (ii) comprises a processor and a memory, said memory containing instructions executable by said processor whereby said first NF is operative to: receive a control request from another NF in the CN, wherein the control request comprises control information that comprises: an indication of a type of filter to be used by the first NF to selectively route uplink data traffic from a UE to a particular session anchor NF; and an indication of a value for the indicated type of filter.

According to some embodiments, there is provided a session management function, SMF, for use in a core network, CN, of a communication network, wherein the SMF is for configuring a first network function, NF, that is to selectively route uplink data traffic in one or more data sessions from a user equipment, UE, to one of a plurality of session anchor NFs. The SMF either (i) is configured to, or (ii) comprises a processor and a memory, said memory containing instructions executable by said processor whereby said SMF is operative to: receive a traffic management request from a network exposure function, NEF, in the CN, wherein the traffic management request comprises traffic management information comprising: an indication of a type of filter to be used by the first NF to selectively route uplink data traffic from a UE to a particular session anchor NF; and an indication of a value for the indicated type of filter; and send a control request to the first NF, wherein the control request comprises control information comprising: the indication of the type of filter to be used by the first NF to selectively route uplink data traffic from a UE to a particular session anchor NF; and the indication of the value for the indicated type of filter.

According to some embodiments, there is provided a network repository function, NRF, for use in a core network, CN, of a communication network, wherein the NRF is for configuring a first network function, NF, that is to selectively route uplink data traffic in one or more data sessions from a user equipment, UE, to one of a plurality of session anchor NFs. The NRF either (i) is configured to, or (ii) comprises a processor and a memory, said memory containing instructions executable by said processor whereby said NRF is operative to: receive a NF discovery request from a network exposure function, NEF, in the CN that requests information about the first NF, wherein the NF discovery request comprises NF discovery information comprising: an indication of a type of filter supported by the first NF to selectively route uplink data traffic from a UE to a particular session anchor NF; and an indication of a value for the indicated type of filter; and send, to the NEF, a response to the NF discovery request indicating the information about the first NF.

According to some embodiments, there is provided a network exposure function, NEF, for use in a core network, CN, of a communication network, wherein the NEF is for configuring a first network function, NF, that is to selectively route uplink data traffic in in one or more data sessions from a user equipment, UE, to one of a plurality of session anchor NFs. The NEF either (i) is configured to, or (ii) comprises a processor and a memory, said memory containing instructions executable by said processor whereby said NEF is operative to: send a NF discovery request to a network repository function, NRF, in the CN that requests information about the first NF, wherein the NF discovery request comprises NF discovery information comprising: an indication of a type of filter supported by the first NF to selectively route uplink data traffic from a UE to a particular session anchor NF; and an indication of a value for the indicated type of filter; receive, from the NRF, a response to the NF discovery request indicating the information about the first NF; and send a control request to another NF in the CN, wherein the control request comprises control information that comprises: the indication of the type of filter supported by the first NF to selectively route uplink data traffic from a UE to a particular session anchor NF; and the indication of the value for the indicated type of filter.

According to some embodiments, there is provided an application function, AF, for use in a core network, CN, of a communication network, wherein the AF is for configuring a first network function, NF, wherein the first NF is to selectively route uplink data traffic in one or more data sessions from a user equipment, UE, to one of a plurality of session anchor NFs. The AF either (i) is configured to, or (ii) comprises a processor and a memory, said memory containing instructions executable by said processor whereby said AF is operative to: send a traffic influence request to a network exposure function, NEF, in the CN, wherein the traffic influence request comprises traffic influence information comprising: an indication of a type of filter to be used by the first NF to selectively route uplink data traffic from a UE to a particular session anchor NF; and an indication of a value for the indicated type of filter; and receive a response to the traffic influence request from the NEF.

According to some embodiments, there is provided a first network function, NF, for use in a core network, CN, of a communication network, wherein the first NF is to selectively route uplink data traffic in one or more data sessions from a user equipment, UE, to one of a plurality of session anchor NFs, wherein the first NF either (i) is configured to, or (ii) comprises a processor and a memory, said memory containing instructions executable by said processor whereby said first NF is operative to: register the first NF at a network repository function, NRF, of the CN according to any disclosed embodiment; configure the first NF according to any disclosed embodiment; receive data traffic from a UE via a radio access network, RAN, of the communication network; use a filter according to indicated type having the indicated value to selectively route the received data traffic from the UE to a particular session anchor NF.

According to some embodiments, there is provided a communication network including a host computer, a user equipment, UE, a base station, a core network, CN, comprising a first network function, NF, for selectively routing uplink data traffic in one or more data sessions from UEs to one of a plurality of session anchor NFs. The communication network is configured to: at the host computer, receive data traffic transmitted from the UE via the base station, the first NF and a particular session anchor NF, wherein the first NF selectively routes the data traffic according to an indication of a type of filter to be used by the first NF and an indication of a value for the indicated type of filter.

In any of the above embodiments, the first NF can be a user plane function, UPF. In any of the above embodiments, the type of filter can relate to an application identity.

BRIEF DESCRIPTION OF THE DRAWINGS

For a better understanding of the embodiments of the present disclosure, and to show how it may be put into effect, reference will now be made, by way of example only, to the accompanying drawings, in which.

DETAILED DESCRIPTION

Figure 1:
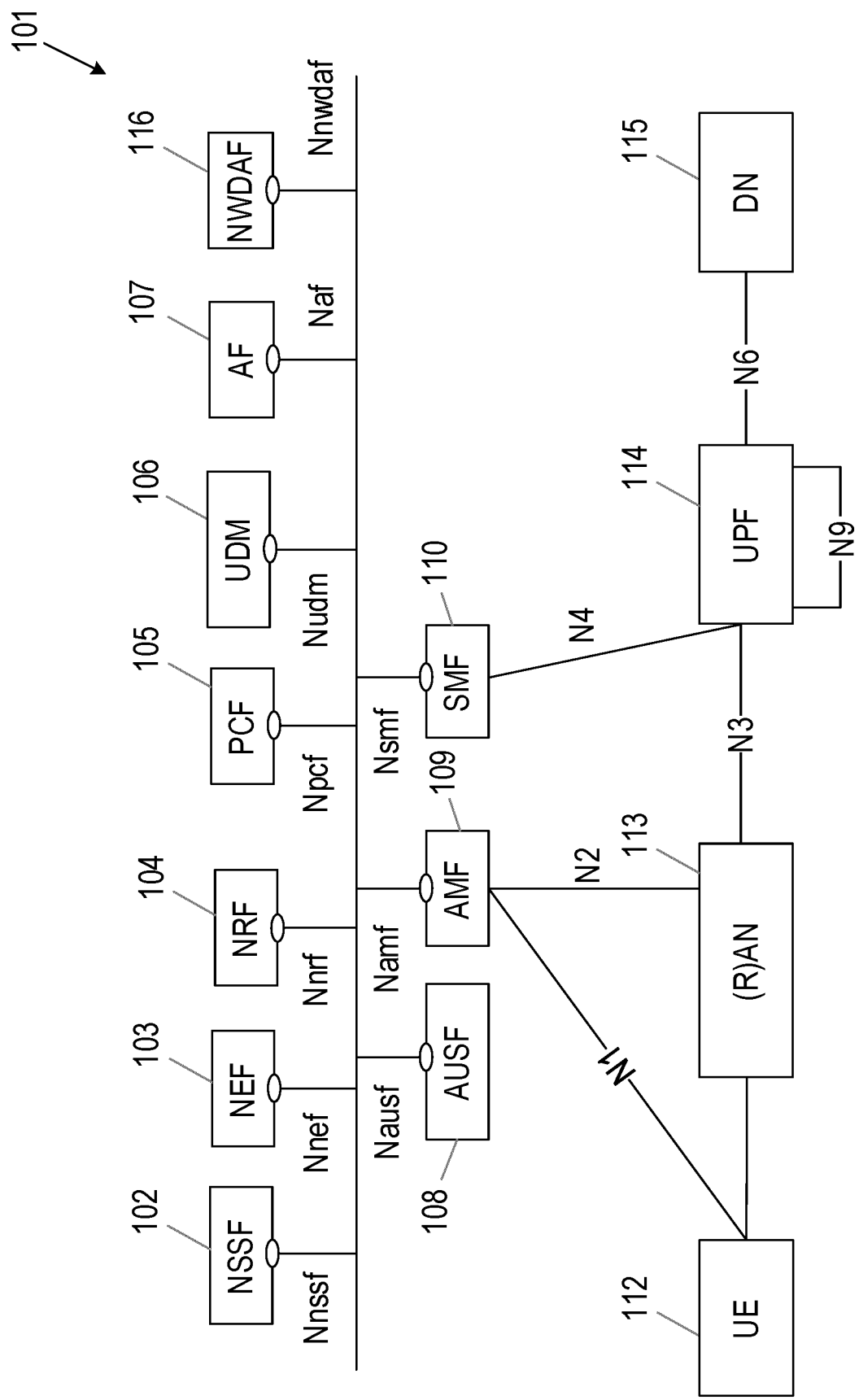
FIG. 1 illustrates a 5G System reference architecture showing service-based interfaces used within the Control Plane.
Figure 2:
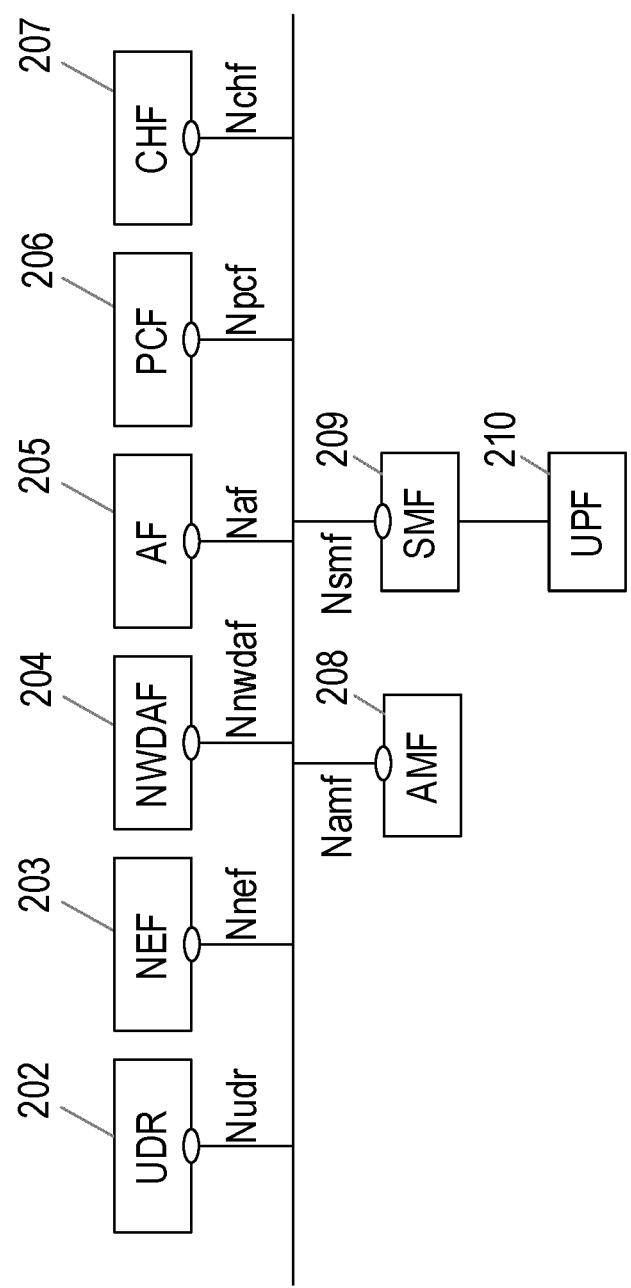
FIG. 2 shows a 3GPP 5GC architecture for policy, charging and analytics.
Figure 3:
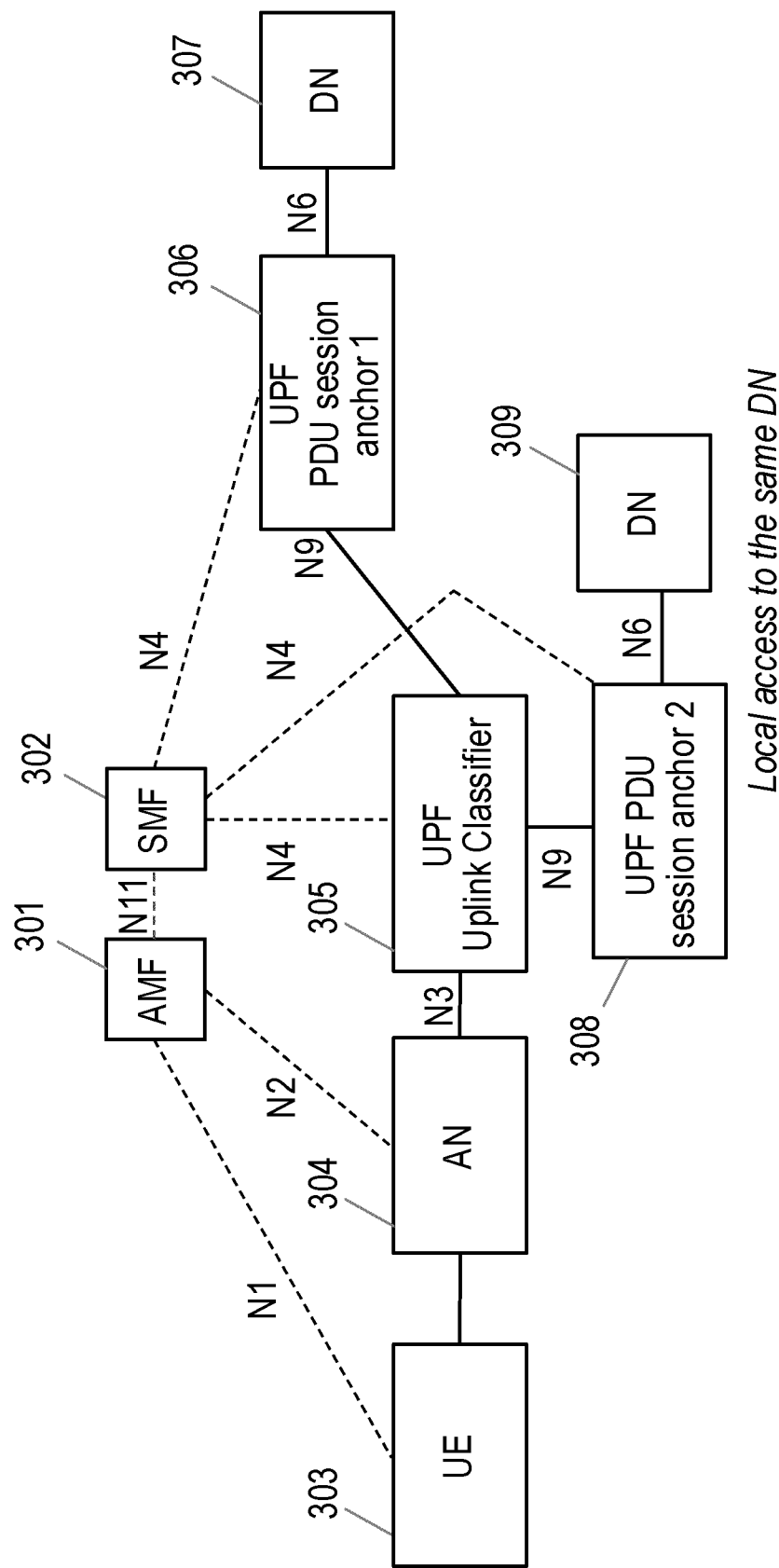
FIG. 3 shows an ULCL UPF that may be combined with several PDU Session Anchor UPFs.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Currently, the 5G network specified by 3GPP only allows the configuration of Traffic Management (TM) functionality (e.g. traffic routing, Quality of Service (QoS) enforcement, etc.) in the User Plane (UP) on a per PDU session basis. The UPF(s) on the traffic path are selected and configured by the SMF when the UE establishes a PDU session. This is defined by the Packet Forwarding Control Protocol (PFCP) functionality also specified by 3GPP, which defines the N4 interface between the UPF and SMF.

However, this approach entails problems with signalling load and UP performance. Regarding signalling load, all the traffic detection rules and commands for the TM actions to execute on the UP traffic must be sent each time a PDU session is established. This is not efficient since some use cases (e.g. Edge Computing) have the same TM rules for a large set of PDU sessions. In other words, there are rules on a per application basis, on a per address prefix/subnetwork basis, etc. Regarding UP performance, the traffic detection rules (so called Packet Detection Rules, PDRs) define the traffic filters/matching conditions that shall be checked per packet in order to apply TM actions (routing, QoS, etc.). Installing the PDRs on a per PDU session basis means that PDRs must be installed for each independent TM action. This means that the UP traffic must be matched against all those installed PDRs on a per PDU session basis, which implies a large number of installed PDRs that have to be stored and analysed per packet, which impacts the UP performance (in terms of processing load and latency) and energy consumption.

According to embodiments described herein, a service-based ULCL (referred to simply as a ULCL) is proposed, i.e. a ULCL offering a SBI (Service-based Interface) towards the CP nodes leveraging the SBA principles. This ULCL may not be PDU session aware and may not be configured on a per PDU session basis. The ULCL instances can be associated and/or configured according to other parameters such as App-IDs, subnetworks, locations, etc.

The foreseen consumers of the services offered by the ULCL are SMF, NEF and possibly AF (if the NEF does not act as intermediator). This is further described in the procedures presented below. The description below is based on the AF influence on traffic routing use case, but other use cases apply such as external QoS requests from an AF. The changes in the procedures needed to support the QoS use case are also described below.

According to embodiments described herein, a ULCL may register in NRF and may associate with SMF. At routing or QoS requests from AF, the ULCL may be configured by either the SMF, or directly by the NEF. At PDU session establishment, the SMF may select the UPFs and ULCL for the PDU sessions but may not interact with the ULCL at any moment. The ULCL may already be configured beforehand in a non-PDU session aware fashion. In turn, SMF may configure the RAN and the UPFs accordingly for the traffic to traverse the ULCL.

Figure 4:
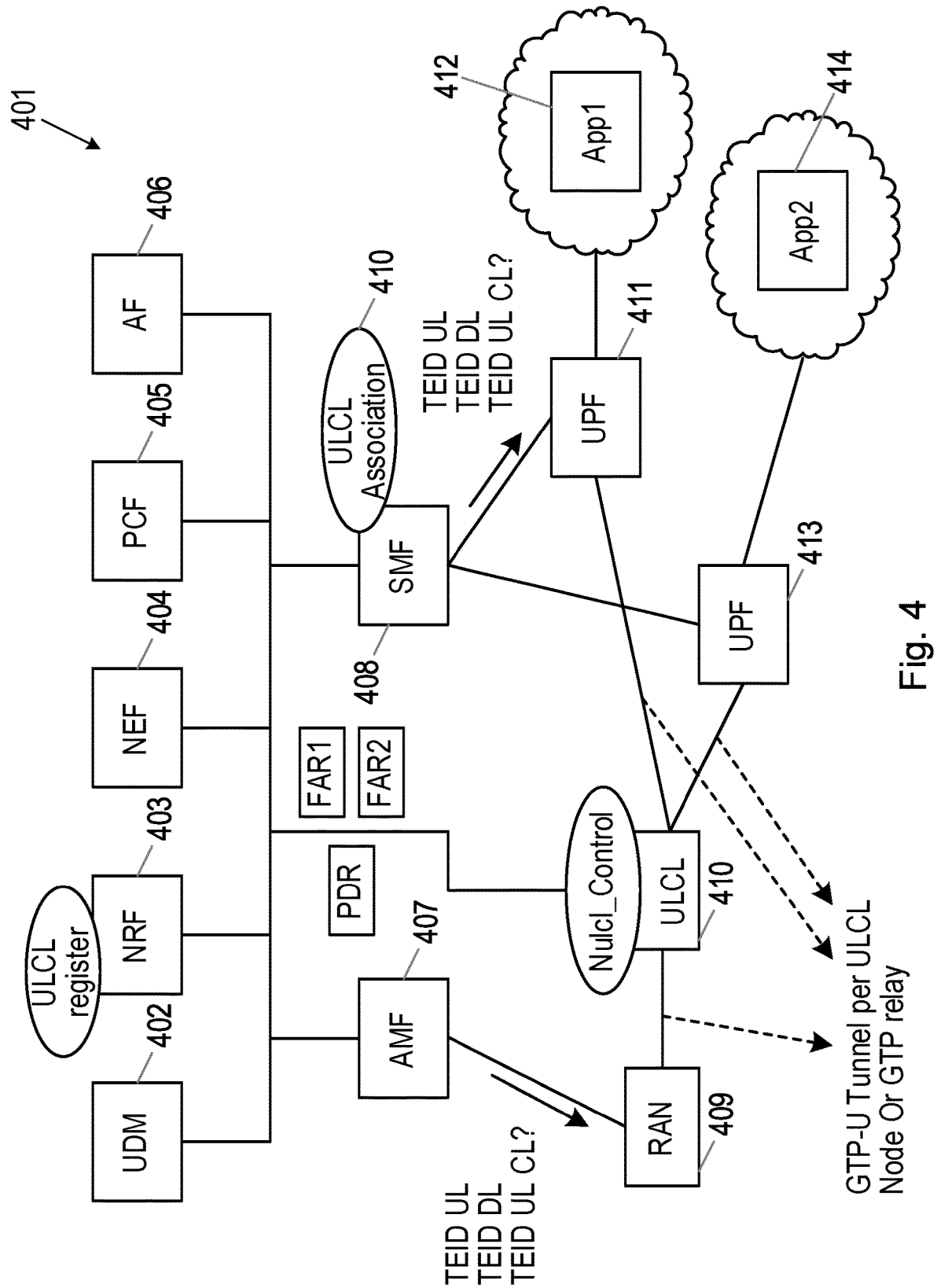
FIG. 4 shows a 5GC architecture according to embodiments described herein.

FIG. 4 shows a 5GC architecture according to embodiments described herein. The architecture 401 comprises NFs in the core network, including a UDM 401, a NRF 403, a NEF 404, a PCF 405, an AF 406, an AMF 407 and an SMF 408. The AMF 407 has an interface to the RAN 409. The architecture includes a ULCL 410 that has a service-based interface, and that has respective interfaces with a first UPF 411 (that is associated with a DN 412/first application (App1)) and a second UPF 413 (that is associated with a DN 414/second application (App2)).

Figure 5:
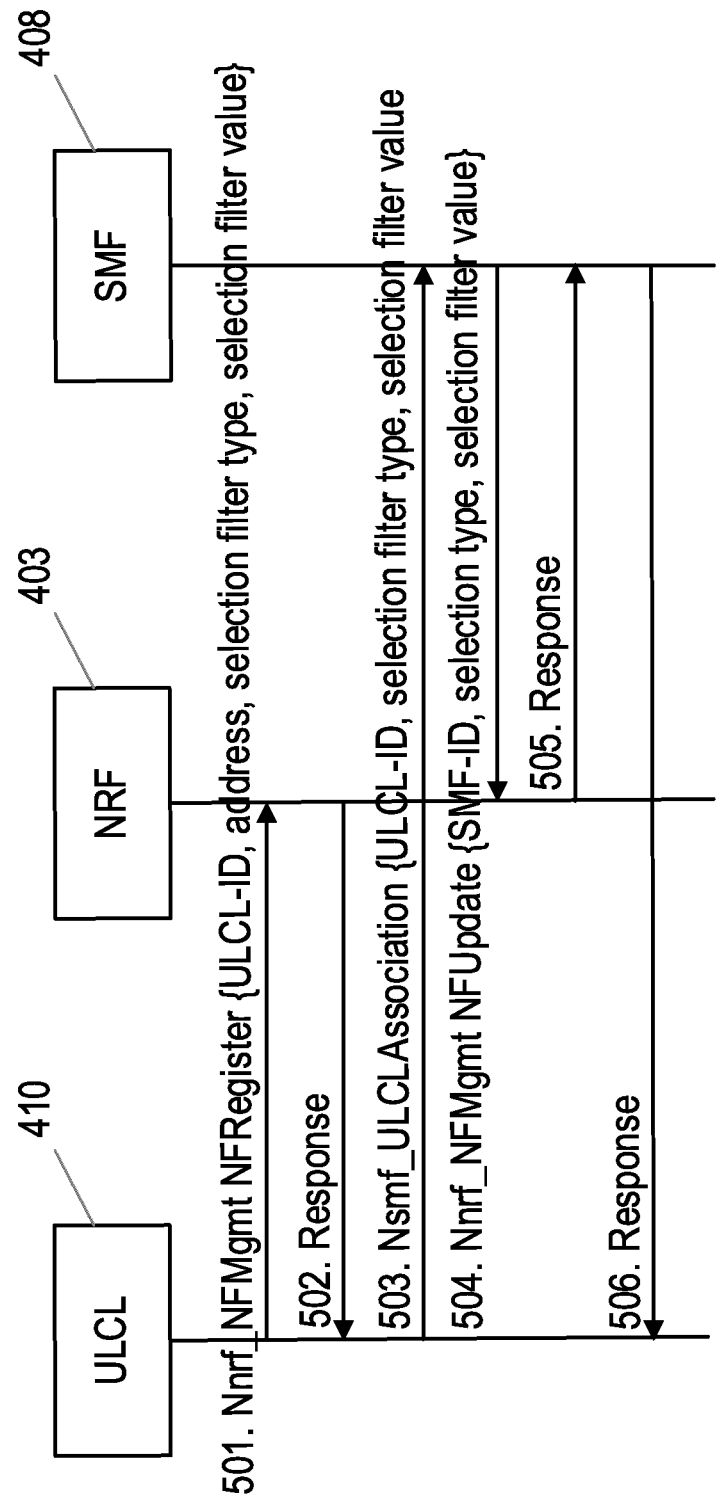
FIG. 5 shows an exemplary registration process of a ULCL with a NRF.

FIG. 5 shows an exemplary registration process of a ULCL 410 with the NRF 403. FIG. 5 also shows an optional association process of the ULCL 410 with the SMF 408.

In step 501 the ULCL 410 transmits a registration request to the NRF. The registration request from the ULCL 410 can invoke the Nnrf_NFMgmt NFRegister service in NRF 403. The registration request can include registration information that may include an ULCL-ID (i.e. an identity of the ULCL 410), a ULCL address (i.e. an address of the ULCL 410), a selection filter type and/or a selection filter value. The selection filter type defines the type of filter that the ULCL 410 is associated to (i.e. the type of filter supported by the ULCL 410). It can be used to discover and select the proper ULCL instance, e.g. for a certain App-ID, or subnetwork (in Edge Computing use cases). In some embodiments, the selection filter type can be any of an Application-ID, a Subnetwork-ID, an Address prefix, a Location, etc. The selection filter value is the value of the corresponding selection filter.

In step 502 the NRF 403 acknowledges (responds to) the registration request by transmitting a response to the ULCL 410.

Although not shown in FIG. 5, after receiving the registration request, the NRF 403 can store the received registration information.

In some embodiments, apart from the registration with the NRF 403, the ULCL 410 can also associate with the SMF 408. This association may be required if the rules that the ULCL 410 receives are in line with the N4 rules handled by the SMF 408. In this case the ULCL 410 transmits an association request to the SMF 408 in step 503. The association request from the ULCL 410 can invoke a Nsmf_ULCLAssociation service in the SMF 408. The association request can include association information that may include the ULCL-ID, the selection filter type (i.e. the one the ULCL 410 is associated to), and/or the selection filter value (i.e. the one the ULCL 410 is associated to).

In step 504, since the SMF 408 shall now be discoverable by the filter types and values of the ULCLs 410 it handles, the SMF 408 updates its SMF profile in the NRF 403 with this information by transmitting an update request to the NRF 403. This update request can invoke the Nnrf_NFMgmt NFUpdate service in the NRF 403. The update request can include update information that includes an SMF-ID (i.e. an identity of the SMF 408), a selection filter type, and/or a selection filter value. The selection filter type and/or selection filter value can be the type and value received in the association request (step 503).

In step 505 the NRF 403 acknowledges (responds to) the update request by transmitting a response to the SMF 408.

Although not shown in FIG. 5, after receiving the update request, the NRF 403 can update the profile of the SMF 408 according to the received update information.

After receiving the response in step 505, the SMF 408 acknowledges (responds to) the association request by transmitting a response to the ULCL 410.

Figure 6:
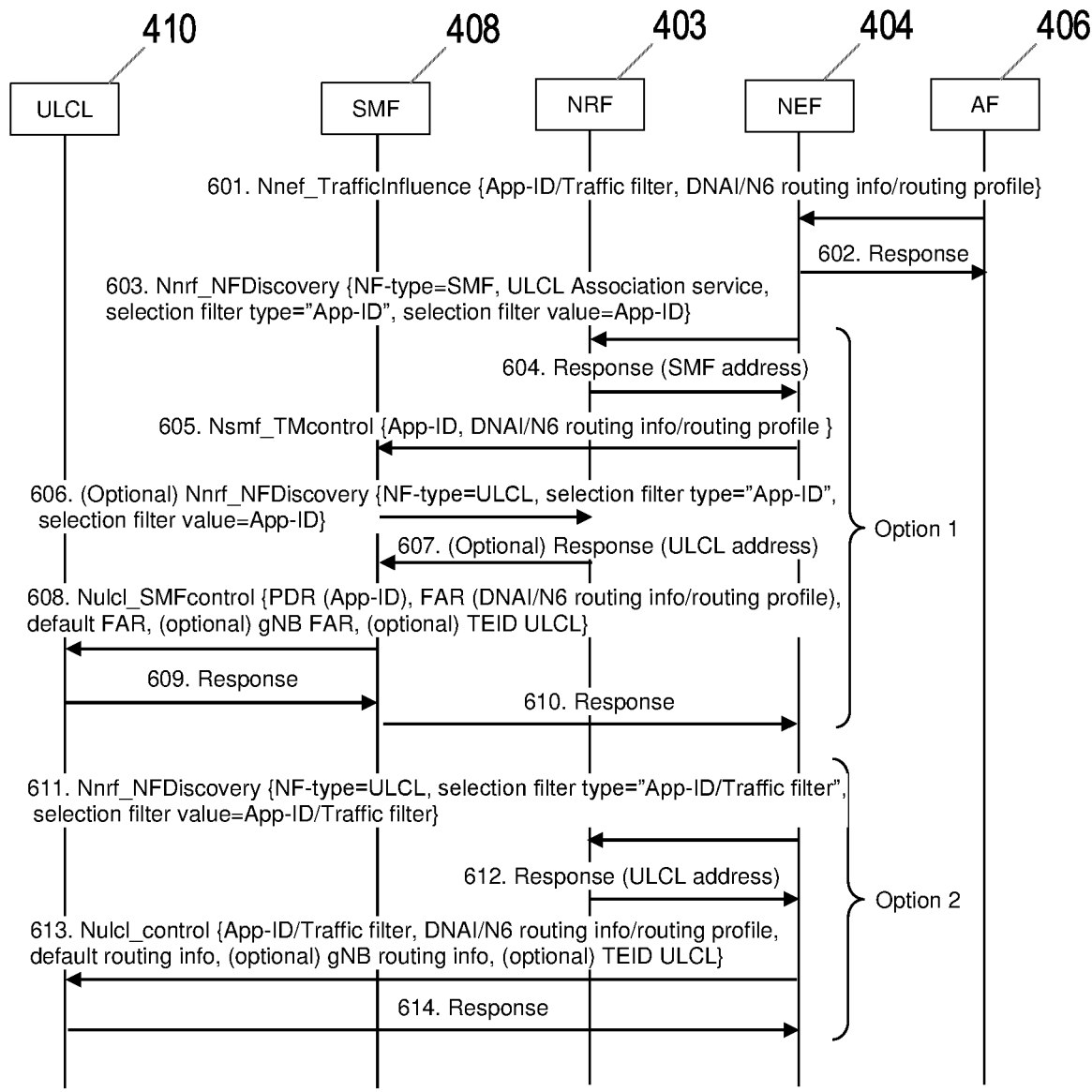
FIG. 6 shows an ULCL configuration process that is triggered by an external routing request by an AF.

FIG. 6 shows an ULCL configuration process that is triggered by an external routing request by an AF 406. The signalling diagram is based on the "AF influence on traffic routing" procedure, but any other TM procedure triggered by an AF 406 can also apply, e.g. a QoS enforcement for a certain App-ID or traffic flow. FIG. 6 includes two variants of the configuration process, a first variant in which the ULCL 410 is configured via the SMF 408, and a second variant in which the ULCL 410 is configured directly by the NEF 404. For the first variant to be used, optional steps 503-506 in FIG. 5 should be performed. For the second variant, optional steps 503-506 in FIG. 5 are not required.

In step 601, the AF 406 sends a traffic influence request to the NEF 404. This requests a certain traffic routing for certain application traffic. The traffic influence request can invoke the Nnef_TrafficInfluence service in the NEF 404. The traffic influence request can include traffic influence information that includes an App-ID/Traffic filter (i.e. the identification of the traffic the request pertains to, and it can be an Application-ID or a specific traffic filter (e.g. IP addresses, ports, etc.)), and/or a Data Network Access Identifier (DNAI)/N6 routing info/routing profile (i.e. the routing action to apply, and it can be defined by means of the DNAI of the DN the traffic is to be routed to, specific routing information or the identification of a specific routing profile that can be pre-configured in the ULCL 410).

In step 602 the NEF 404 acknowledges (responds to) the traffic influence request by transmitting a response to the AF 406.

First variant—As noted above, in this variant the ULCL 410 is configured via the SMF 408. Thus, in step 603, the NEF 404 transmits a NF discovery request to the NRF 403 to discover the SMF 408 handling the proper ULCL 410. The NF discovery request can invoke the Nnrf_NFDiscovery service in the NRF 403. The NF discovery request can include NF discovery information that includes an NF-type=SMF, an indication that the SMF 408 shall support the ULCL Association service, a selection filter type (i.e. "App-ID"/"Traffic-filter"), and/or a selection filter value.

In step 604 the NRF 403 transmits a response to the AF 406. The response includes the address of the SMF 408, or a list of addresses of possible SMFs 408.

In step 605, the NEF 404 transmits a traffic management (TM) control request to the SMF 408. The TM control request is used to send the routing (e.g. TM, traffic management) information received from the AF 406 from the NEF 404 to the SMF 408. The control request can invoke a Nsmf_TMcontrol service in the SMF 408. The control request can include control information that comprises an App-ID/Traffic filter, and/or a DNAI/N6 routing info/routing profile.

In some embodiments, after receiving the TM control request, if the SMF 408 does not have the necessary information regarding the ULCL 410, it can use the NRF 403 to discover the ULCL 410 by the SMF 408 transmitting a NF discovery request to the NRF 403. This is step 606. This NF discovery request can invoke a Nnrf_NFDiscovery service in the NRF 403. The NF discovery request can include NF discovery information such as NF-type=ULCL, the selection filter type and/or the selection filter value.

In step 607 the NRF 403 transmits a response to the SMF 408. The response includes the address of the ULCL 410, or a list of addresses of possible ULCLs 410.

After step 607, or if the SMF 408 does have the necessary information regarding the ULCL 410 when the TM control request is received, the SMF 408 transmits a control request to the ULCL 410. This is step 608. The control request can invoke a Nulcl_SMFcontrol service in the ULCL 410. According to the method in FIG. 5, the ULCL 410 has registered its ability with the NRF 403 to route traffic based on a specific filter. The control request in step 608 enables the filter in the ULCL 410 and instructs the ULCL 410 how it should route the traffic. The control request can include control information that includes any or all of: a Packet Detection Rule (PDR), including an App-ID/traffic filter; a Forwarding Action Rule (FAR), including the DNAI/N6 routing info/routing profile; and/or a default FAR which can allow the ULCL 410 to determine how to route the default traffic that does not match the above PDR. The default FAR can be determined by the SMF 408 or it can be configuration information accessible via an Operations Support System (OSS).

Optionally the control information in the control request transmitted in step 608 can further include a gNB (a radio access node in a 5G network) FAR, which allows the ULCL 410 to determine how to route the downlink (DL) traffic towards the proper gNB. If the gNB FAR is not provided, the ULCL 410 may use the source address of the UL traffic (coming from the gNB) of a certain UE as a destination address (towards the gNB) for the corresponding DL traffic destined to that UE. The SMF 408 can build this FAR from the ULCL configuration information available via OSS.

Optionally the control information in the control request transmitted in step 608 can further include a Tunnel Endpoint ID (TEID) of the ULCL 410, which is useful in case the ULCL 410 is configured to perform different actions depending on the tunnel Identifier (TEID) with the ULCL 410. This information can be also part of the PDR. This information can be provided separately for Uplink and Downlink (i.e. TEID ULCL DL, TEID ULCL UL). The TEID can be used in a GPRS Tunnelling Protocol User Plane (GTP-U) header.

In step 609 the ULCL 410 transmits a response to the SMF 408 to acknowledge the control request and the configuration in the request.

In step 610 the SMF 408 transmits a response to the TM control request (received in step 605) to the NEF 404.

Second variant—As noted above, in a second variant of the configuration process, the ULCL 410 is configured directly by the NEF 404. In step 611, NEF 404 transmits a NF discovery request to the NRF 403 to discover the relevant ULCL 410. The NF discovery request can invoke the Nnrf_NFDiscovery service in the NRF 403. The NF discovery request can include NF discovery information that includes an NF-type=ULCL, a selection filter type (i.e. "App-ID"/"Traffic-filter"), and/or a selection filter value.

In step 612 the NRF 403 transmits a response to the AF 406. The response includes the address of the ULCL 410, or a list of addresses of possible ULCLs 410.

The NEF 404 transmits a control request to the ULCL 410. This is step 613. The control request can invoke a Nulcl_control service in the ULCL 410. According to the method in FIG. 5, the ULCL 410 has registered its ability with the NRF 403 to route traffic based on a specific filter. The control request in step 613 enables the filter in the ULCL 410 and instructs the ULCL 410 how it should route the traffic. The control request can include control information that includes any or all of: an App-ID/traffic filter; a DNAI/N6 routing info/routing profile; and/or default routing information which can allow the ULCL 410 to determine how to route the default traffic that does not match the above App-ID/traffic filter.

Optionally the control information in the control request transmitted in step 613 can further include a gNB routing information, which allows the ULCL 410 to determine how to route the downlink (DL) traffic towards the proper gNB. The gNB routing information is equivalent to the default FAR in step 608 of the first variant. The NEF 404 can access this information either via OSS or by asking the SMF 408 for this information (the SMF 408 can provide the routing info towards the default Data Network, e.g. the Internet). This request to the SMF 408 is not shown in FIG. 6.

If the gNB routing is not provided, the ULCL 410 may use the source address of the UL traffic (coming from the gNB) of a certain UE as a destination address (towards the gNB) for the corresponding DL traffic destined to that UE. The NEF 404 can obtain this information from the ULCL configuration information available via OSS.

Optionally the control information in the control request transmitted in step 613 can further include a Tunnel Endpoint ID (TEID) of the ULCL 410, which is useful in case the ULCL 410 is configured to perform different actions depending on the tunnel Identifier (TEID) with the ULCL 410. This information can be provided separately for Uplink and Downlink (i.e. TEID ULCL DL, TEID ULCL UL).

In step 614 the ULCL 410 transmits a response to the NEF 404 to acknowledge the control request and the configuration in the request.

It should be noted that a core network (e.g. including NRF 403, a NEF 404, a SMF 408, and an ULCL 410) can be configured to operate according to one of the first variant and the second variant outlined above. Alternatively a core network (e.g. including NRF 403, a NEF 404, a SMF 408, and an ULCL 410) can be configured to operate according to either of the first variant and the second variant outlined above. In other words, the NFs in the core network can select whether the ULCL 410 is configured via the SMF 408 or configured directly by the NEF 404.

As noted above, the procedures in FIG. 5 and FIG. 6 relate to the AF influence on traffic routing use case. In case the request (step 601) from the AF 406 is a QoS request ("Application Session with specific QoS" procedure in 3GPP), the changes in the procedure of FIG. 6 would include:

in step 601 the AF 406 sends QoS information in the traffic influence information instead of DNAI/routing info/routing profile;

in step 605 the NEF 404 sends QoS information in the TM control information instead of the DNAI/routing info/routing profile;

in step 608 the SMF 408 sends a QER (Quality Enforcement Rule) including the QoS information in the control information instead of the FAR. The control information may also include default QoS information;

in step 613 the SMF 408 sends QoS information in the control information instead of the DNAI/routing info/routing profile. The control information may also include default QoS information.

In some embodiments, the traffic influence information in the traffic influence request transmitted by the AF 406 to the NEF 404 in step 601 can also include a selection filter type and/or a selection filter value. In this case, the TM control request transmitted by the NEF 404 to the SMF 408 can also include the selection filter type and/or the selection filter value that was received in the traffic influence request.

Figure 7:
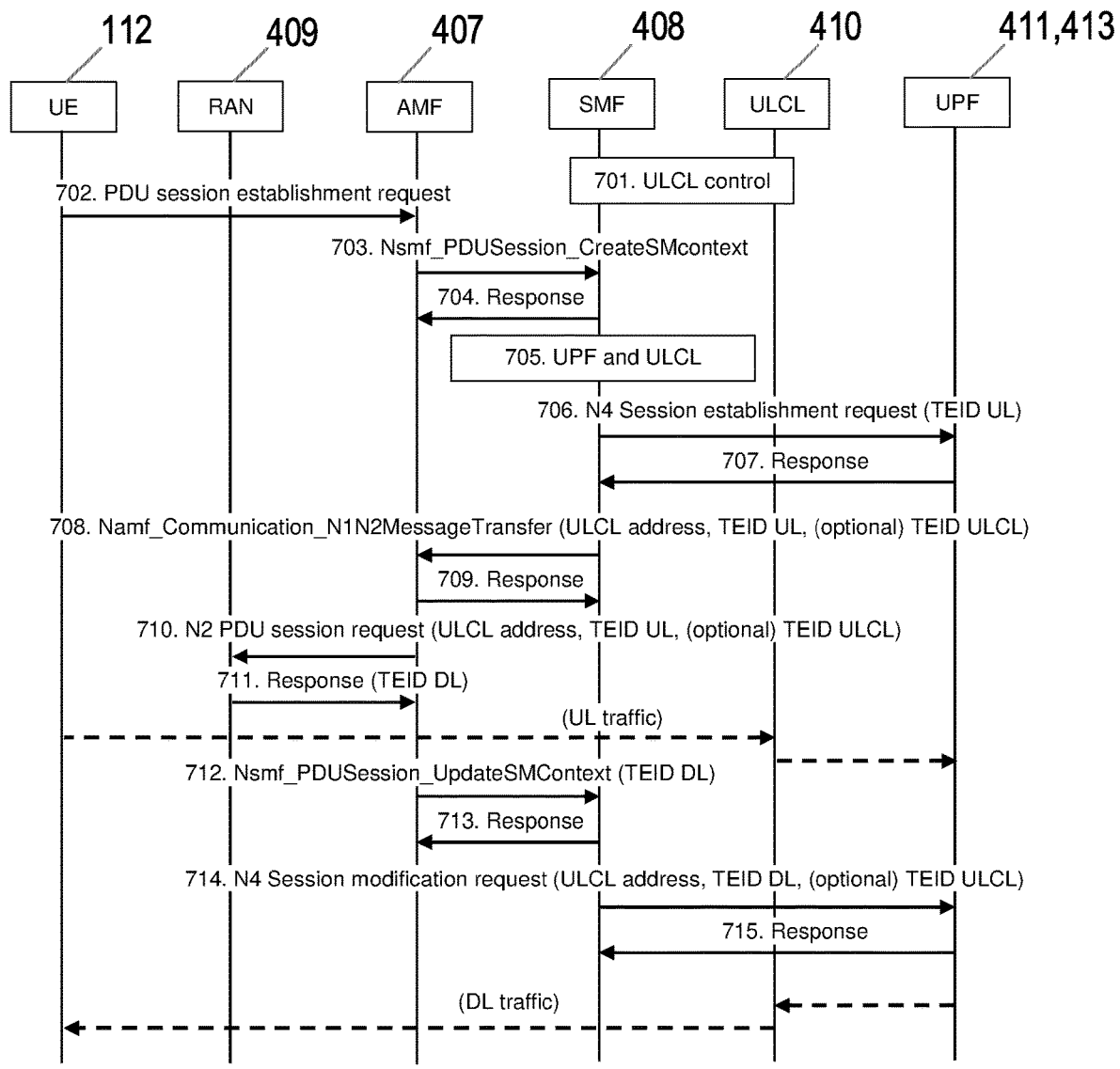
FIG. 7 shows an exemplary PDU session establishment procedure.

FIG. 7 illustrates an exemplary PDU session establishment procedure. FIG. 7 illustrates one or more benefits of the embodiments described herein. In particular, a benefit is that an SMF can insert an ULCL in the UP data path without interacting with it during the PDU session establishment procedure. This can be due to the ULCL not being PDU session aware, and it is configured per App-ID, subnetwork, etc., and not per PDU session.

In step 701 the ULCL 410 is configured and/or controlled as per the exemplary procedures described with reference to FIG. 6.

In step 702 a UE 112 triggers a PDU session establishment with the AMF 407, by transmitting a PDU session establishment request to the AMF 407.

In step 703 the AMF 407 sends a request to the SMF 408 that can invoke the Nsmf_PDUSession_CreateSMcontext service in the SMF 408.

In step 704 the SMF 408 transmits a response to the AMF 407 to acknowledge the request.

In step 705 the SMF 408 selects the UPFs 411, 413 and ULCL 410 for the PDU session. It should be noted that, although not shown in FIG. 7 in step 705 the SMF 408 can interact with an orchestration system in OSS to trigger the instantiation and deployment of a ULCL 410 with a certain configuration (e.g. a certain default routing information or gNB routing information) in case it is convenient or needed for the PDU session.

In step 706 the SMF 408 establishes an N4 session with the selected UPFs 411, 413, including the tunnel ID for the UL traffic (TEID UL), by sending a session establishment request to the UPF(s) 411, 413.

In step 707 the UPF(s) 411, 413 transmit a response to the SMF 408 to acknowledge the session establishment request.

In step 708 the SMF 408 triggers a N2 message transfer request to RAN 409 by transmitting a request to the AMF 407 that invokes the Namf_Communication_N1N2MessageTransfer service in the AMF 407. The request can include information including a ULCL address, a TEID UL and optionally a TEID ULCL. In the case of the TEID ULCL, if the traffic between the RAN 409 and ULCL 410 and between the ULCL 410 and the UPF 41/413 is encapsulated in an external GTP-U tunnel (double GTP-U encapsulation), the SMF 408 can send the TEID of the external tunnel so that the traffic can be encapsulated using that TEID. This information can also be provided separately for UL and DL (i.e. TEID ULCL UL, TEID ULCL DL).

In step 709 the AMF 407 transmits a response to the SMF 408 to acknowledge the N2 message transfer request.

In step 710 the AMF 407 sends a N2 PDU session request message to the RAN 409 that includes the information carried in the previous message (i.e. the N2 message transfer request).

In step 711 the RAN 409 transmits a response to the N2 PDU session request message to the AMF 407 to acknowledge the message. The response can include the allocated tunnel ID in the RAN 409 (i.e. TEID DL).

After step 711, all the nodes (NFs) are configured for the UL traffic from the UE 112 to traverse the ULCL 410. The UL traffic is indicated by the dashed arrow from the UE 112 to the ULCL 410, and the dashed arrow from the ULCL 410 to a UPF 411, 413.

In step 712 the AMF 407 can transmit an update request to the SMF 408 that invokes the Nsmf_PDUSession_UpdateSMContext service in the SMF 408. The update request can include the TEID DL.

In step 713 the SMF 408 transmits a response to the AMF 407 to acknowledge the update request.

In step 714 the SMF 408 transmits a N4 Session modification request message to the UPF(s) 411, 413. This request can include a ULCL address, a TEID DL, and optionally a TEID ULCL. In the case of the TEID ULCL, if the traffic between the RAN 409 and the ULCL 410 and between the ULCL 410 and the UPF 411, 413 is encapsulated in an external GTP-U tunnel (double GTP-U encapsulation), the SMF 408 can send the TEID of the external tunnel so that the traffic can be encapsulated using that TEID. This information can also be provided separately for UL and DL (i.e. TEID ULCL UL, TEID ULCL DL). It should be noted that the TEID ULCL UL and/or TEID ULCL DL can be different to those in step 708.

In step 715 the UPF 411, 413 transmits a response to the SMF 408 to acknowledge the session modification request. After step 715 all the nodes (NFs) are configured for both the UL and DL traffic to take place traversing the ULCL 410. The DL traffic is indicated by the dashed arrow from the UPF 411/413 to the ULCL 410, and the dashed arrow from the ULCL 410 to the UE 112.

Figure 8:
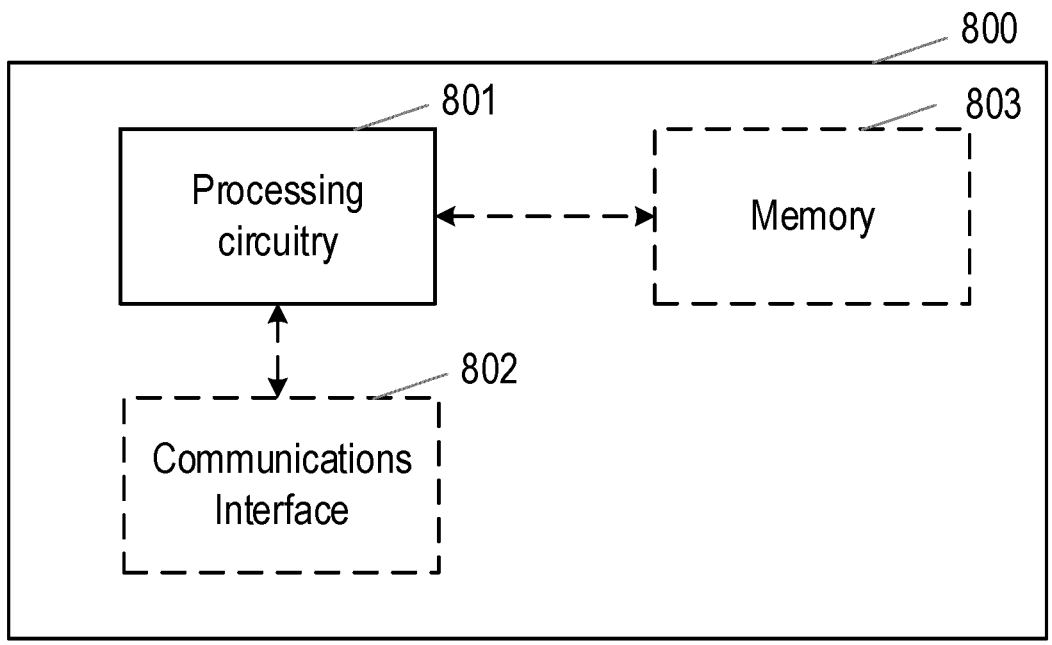
FIG. 8 shows a ULCL comprising processing circuitry (or logic)

FIG. 8 illustrates a NF 800 comprising processing circuitry (or logic) 801. The NF 800 may comprise or be the ULCL NF 410 described above. Thus the NF 800 is to selectively route uplink data traffic in one or more data sessions from a UE 112 to one of a plurality of session anchor NFs.

It will be appreciated that the NF 800 may comprise one or more virtual machines running different software and/or processes. The NF 800 may therefore comprise one or more servers, switches and/or storage devices and/or may comprise cloud computing infrastructure that runs the software and/or processes.

The processing circuitry 801 controls the operation of the NF 800 and can implement the methods described herein in relation to a "first NF"/ULCL 410. The processing circuitry 801 can comprise one or more processors, processing units, multi-core processors or modules that are configured or programmed to control the NF 800 in the manner described herein. In particular implementations, the processing circuitry 801 can comprise a plurality of software and/or hardware modules that are each configured to perform, or are for performing, individual or multiple steps of the method described herein in relation to the NF 800 or ULCL 410.

Briefly, in embodiments in which the NF 800 is to register at NRF 403 of a CN of a communication network, the processing circuitry 801 of the NF 800 can be configured to send a registration request to the NRF 403. The registration request can comprise registration information comprising: an indication of a type of filter supported by the NF 800 to selectively route uplink data traffic from a UE to a particular session anchor NF, and an indication of a value for the indicated type of filter.

In further or alternative embodiments in which the NF 800 is to be configured, the processing circuitry 801 of the NF 800 can be configured to receive a control request from another NF in the CN. The control request comprises control information that can comprise an indication of a type of filter to be used by the NF 800 to selectively route uplink data traffic from a UE 112 to a particular session anchor NF 306, 308, and an indication of a value for the indicated type of filter.

In further or alternative embodiments, the processing circuitry 801 of the NF 800 can be configured to receive data traffic from a UE 112 via RAN 113, and use a filter according to indicated type having the indicated value to selectively route the received data traffic from the UE 112 to a particular session anchor NF 306, 308.

In some embodiments, the NF 800 may optionally comprise a communications interface 802. The communications interface 802 of the NF 800 can be for use in communicating with other nodes, such as other virtual nodes. For example, the communications interface 802 of the NF 800 can be configured to transmit to and/or receive from other nodes or network functions requests, resources, information, data, signals, or similar. The processing circuitry 801 of NF 800 may be configured to control the communications interface 802 of the NF 800 to transmit to and/or receive from other nodes or network functions requests, resources, information, data, signals, or similar.

Optionally, the NF 800 may comprise a memory 803. In some embodiments, the memory 803 of the NF 800 can be configured to store program code that can be executed by the processing circuitry 801 of the NF 800 to perform the method described herein in relation to the NF 800, or ULCL 410. Alternatively or in addition, the memory 803 of the NF 800, can be configured to store any requests, resources, information, data, signals, or similar that are described herein. The processing circuitry 801 of the NF 800 may be configured to control the memory 803 of the NF 800 to store any requests, resources, information, data, signals, or similar that are described herein.

Figure 9:
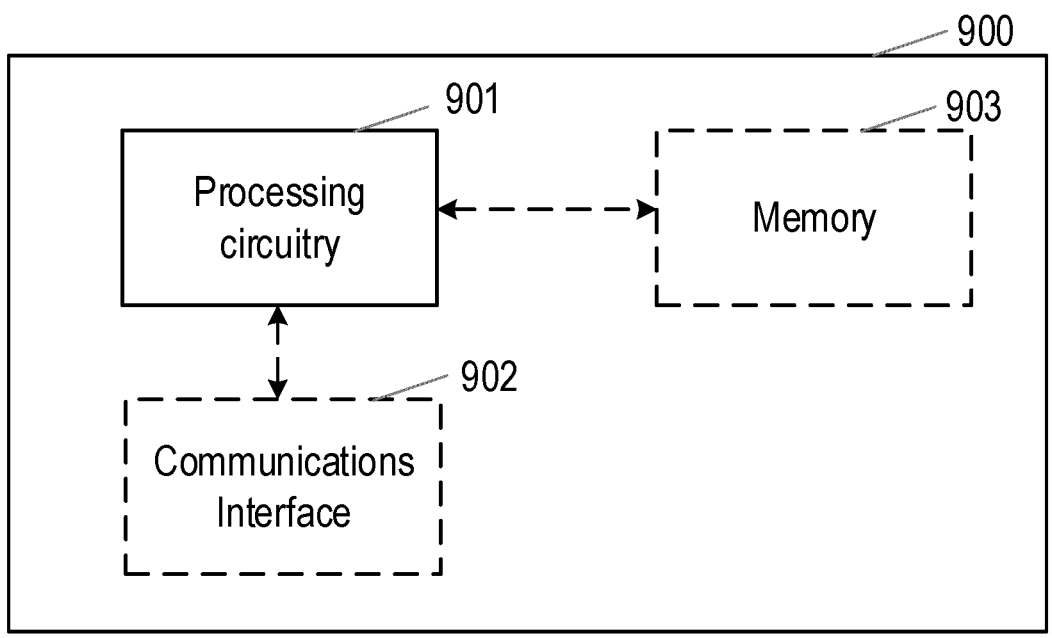
FIG. 9 shows a NRF comprising processing circuitry (or logic)

FIG. 9 illustrates a NRF 900 comprising processing circuitry (or logic) 901. The NRF 900 may comprise or be the NRF 403 described above. Thus the NRF 900 is to register and/or configure an ULCL 410.

It will be appreciated that the NRF 900 may comprise one or more virtual machines running different software and/or processes. The NRF 900 may therefore comprise one or more servers, switches and/or storage devices and/or may comprise cloud computing infrastructure that runs the software and/or processes.

The processing circuitry 901 controls the operation of the NRF 900 and can implement the methods described herein in relation to a NRF 403. The processing circuitry 901 can comprise one or more processors, processing units, multi-core processors or modules that are configured or programmed to control the NRF 900 in the manner described herein. In particular implementations, the processing circuitry 901 can comprise a plurality of software and/or hardware modules that are each configured to perform, or are for performing, individual or multiple steps of the method described herein in relation to the NRF 900 or NRF 403.

Briefly, in embodiments in which a ULCL 410 of a CN of a communication network is to register at the NRF 900, the processing circuitry 901 of the NRF 900 can be configured to receive a registration request from the ULCL 410. The registration request can comprise registration information comprising: an indication of a type of filter supported by the ULCL 410 to selectively route uplink data traffic from a UE 112 to a particular session anchor NF 306, 308, and an indication of a value for the indicated type of filter.

In further or alternative embodiments in which the NRF 900 is to configure an ULCL 410, the processing circuitry 901 of the NRF 900 can be configured to receive a discovery request from a NEF 404 in the CN. The discovery request can comprise discovery information that can comprise an indication of a type of filter supported by the ULCL 410 to selectively route uplink data traffic from a UE 112 to a particular session anchor NF 306, 308, and an indication of a value for the indicated type of filter. The processing circuitry 901 can also be configured to send, to the NEF 404, a response to the discovery request indicating the information about the ULCL 410.

In some embodiments, the NRF 900 may optionally comprise a communications interface 902. The communications interface 902 of the NRF 900 can be for use in communicating with other nodes, such as other virtual nodes. For example, the communications interface 902 of the NRF 900 can be configured to transmit to and/or receive from other nodes or network functions requests, resources, information, data, signals, or similar. The processing circuitry 901 of NRF 900 may be configured to control the communications interface 902 of the NRF 900 to transmit to and/or receive from other nodes or network functions requests, resources, information, data, signals, or similar.

Optionally, the NRF 900 may comprise a memory 903. In some embodiments, the memory 903 of the NRF 900 can be configured to store program code that can be executed by the processing circuitry 901 of the NRF 900 to perform the method described herein in relation to the NRF 900 or NRF 403. Alternatively or in addition, the memory 903 of the NRF 900, can be configured to store any requests, resources, information, data, signals, or similar that are described herein. The processing circuitry 901 of the NRF 900 may be configured to control the memory 903 of the NRF 900 to store any requests, resources, information, data, signals, or similar that are described herein.

Figure 10:
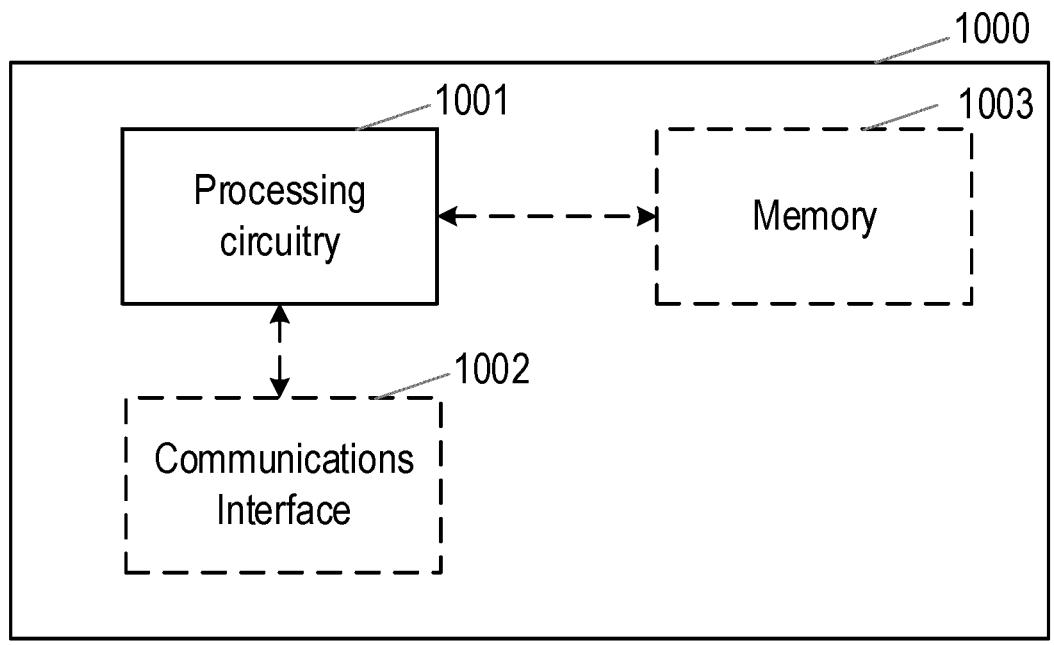
FIG. 10 shows a SMF comprising processing circuitry (or logic)

FIG. 10 illustrates a SMF 1000 comprising processing circuitry (or logic) 1001. The SMF 1000 may be used in a registration and/or configuration process for a ULCL 410.

It will be appreciated that the SMF 1000 may comprise one or more virtual machines running different software and/or processes. The SMF 1000 may therefore comprise one or more servers, switches and/or storage devices and/or may comprise cloud computing infrastructure that runs the software and/or processes.

The processing circuitry 1001 controls the operation of the SMF 1000 and can implement the methods described herein in relation to a SMF 408. The processing circuitry 1001 can comprise one or more processors, processing units, multi-core processors or modules that are configured or programmed to control the SMF 1000 in the manner described herein. In particular implementations, the processing circuitry 1001 can comprise a plurality of software and/or hardware modules that are each configured to perform, or are for performing, individual or multiple steps of the method described herein in relation to the SMF 1000 or SMF 408.

Briefly, in embodiments in which the ULCL 410 is to register at NRF 403 of a CN of a communication network, the processing circuitry 1001 of the SMF 1000 can be configured to receive an association request from the ULCL 410. The association request can comprise association information comprising: an indication of a type of filter supported by the ULCL 410 to selectively route uplink data traffic from a UE 112 to a particular session anchor NF 306, 308, and an indication of a value for the indicated type of filter.

In further or alternative embodiments in which the ULCL 410 is to be configured, the processing circuitry 1001 of the SMF 1000 can be configured to receive a traffic management request from a NEF 404 in the CN. The traffic management request comprises traffic management information that can comprise an indication of a type of filter to be used by the NF 410 to selectively route uplink data traffic from a UE 112 to a particular session anchor NF 306, 308, and an indication of a value for the indicated type of filter. The processing circuitry 1001 of the SMF 1000 can also be configured to send a control request to the ULCL 410. The control request can comprise control information comprising the indication of the type of filter to be used by the ULCL 410 to selectively route uplink data traffic from a UE 112 to a particular session anchor NF 306, 308, and the indication of the value for the indicated type of filter.

In some embodiments, the SMF 1000 may optionally comprise a communications interface 1002. The communications interface 1002 of the SMF 1000 can be for use in communicating with other nodes, such as other virtual nodes. For example, the communications interface 1002 of the SMF 1000 can be configured to transmit to and/or receive from other nodes or network functions requests, resources, information, data, signals, or similar. The processing circuitry 1001 of SMF 1000 may be configured to control the communications interface 1002 of the SMF 1000 to transmit to and/or receive from other nodes or network functions requests, resources, information, data, signals, or similar.

Optionally, the SMF 1000 may comprise a memory 1003. In some embodiments, the memory 1003 of the SMF 1000 can be configured to store program code that can be executed by the processing circuitry 1001 of the SMF 1000 to perform the method described herein in relation to the SMF 1000, or SMF 408. Alternatively or in addition, the memory 1003 of the SMF 1000, can be configured to store any requests, resources, information, data, signals, or similar that are described herein. The processing circuitry 1001 of the SMF 1000 may be configured to control the memory 1003 of the SMF 1000 to store any requests, resources, information, data, signals, or similar that are described herein.

Figure 11:
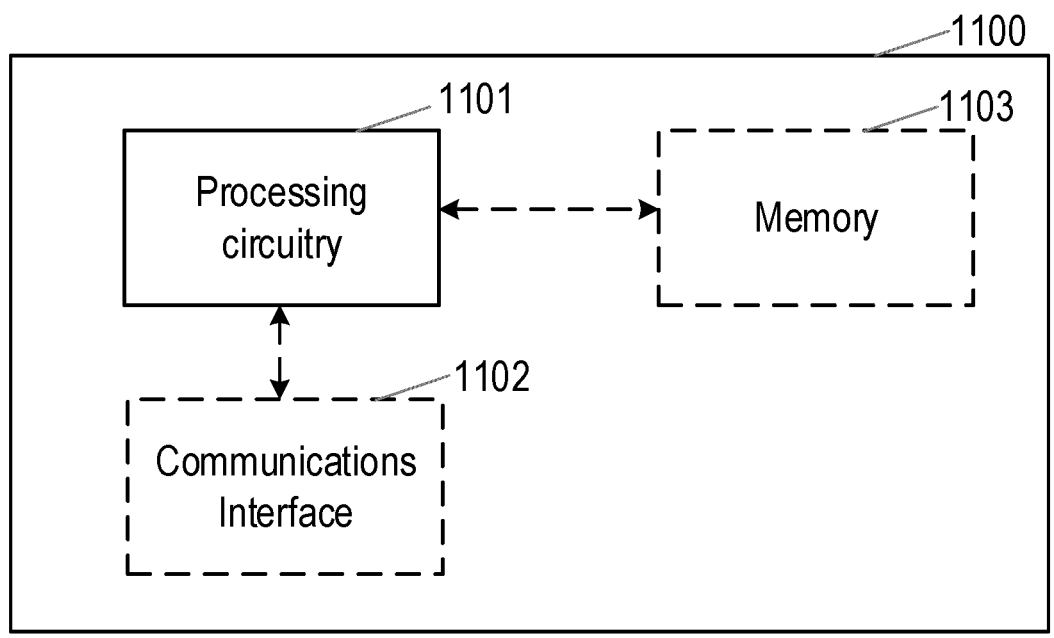
FIG. 11 shows a NEF comprising processing circuitry (or logic)

FIG. 11 illustrates a NEF 1100 comprising processing circuitry (or logic) 1101. The NEF 1100 may comprise or be the NEF 404 described above. Thus the NEF 1100 can be used in a configuration process for a ULCL 410.

It will be appreciated that the NEF 1100 may comprise one or more virtual machines running different software and/or processes. The NEF 1100 may therefore comprise one or more servers, switches and/or storage devices and/or may comprise cloud computing infrastructure that runs the software and/or processes.

The processing circuitry 1101 controls the operation of the NEF 1100 and can implement the methods described herein in relation to a NEF 404. The processing circuitry 1101 can comprise one or more processors, processing units, multi-core processors or modules that are configured or programmed to control the NEF 1100 in the manner described herein. In particular implementations, the processing circuitry 1101 can comprise a plurality of software and/or hardware modules that are each configured to perform, or are for performing, individual or multiple steps of the method described herein in relation to the NEF 1100 or NEF 404.

Briefly, in embodiments in which a NRF 403 in the CN is used in a configuration process of a ULCL 410, the processing circuitry 1101 of the NEF 1100 can be configured to send a discovery request to a NRF 403. The discovery request comprises discovery information that can comprise an indication of a type of filter supported by the ULCL 410 to selectively route uplink data traffic from a UE 112 to a particular session anchor NF 306, 308, and an indication of a value for the indicated type of filter. The processing circuitry 1101 can also be configured to receive, from the NRF 403, a response to the discovery request indicating the information about the ULCL 410, and send a control request to another NF in the CN. The another NF may be an SMF 408 or the ULCL 410. The control request may comprise control information that comprises the indication of the type of filter supported by the ULCL 410 to selectively route uplink data traffic from a UE 112 to a particular session anchor NF 306, 308, and the indication of the value for the indicated type of filter.

In some embodiments, the NEF 1100 may optionally comprise a communications interface 1102. The communications interface 1102 of the NEF 1100 can be for use in communicating with other nodes, such as other virtual nodes. For example, the communications interface 1102 of the NEF 1100 can be configured to transmit to and/or receive from other nodes or network functions requests, resources, information, data, signals, or similar. The processing circuitry 1101 of NEF 1100 may be configured to control the communications interface 1102 of the NEF 1100 to transmit to and/or receive from other nodes or network functions requests, resources, information, data, signals, or similar.

Optionally, the NEF 1100 may comprise a memory 1103. In some embodiments, the memory 1103 of the NEF 1100 can be configured to store program code that can be executed by the processing circuitry 1101 of the NEF 1100 to perform the method described herein in relation to the NEF 1100, or NEF 404. Alternatively or in addition, the memory 1103 of the NEF 1100, can be configured to store any requests, resources, information, data, signals, or similar that are described herein. The processing circuitry 1101 of the NEF 1100 may be configured to control the memory 1103 of the NEF 1100 to store any requests, resources, information, data, signals, or similar that are described herein.

Figure 12:
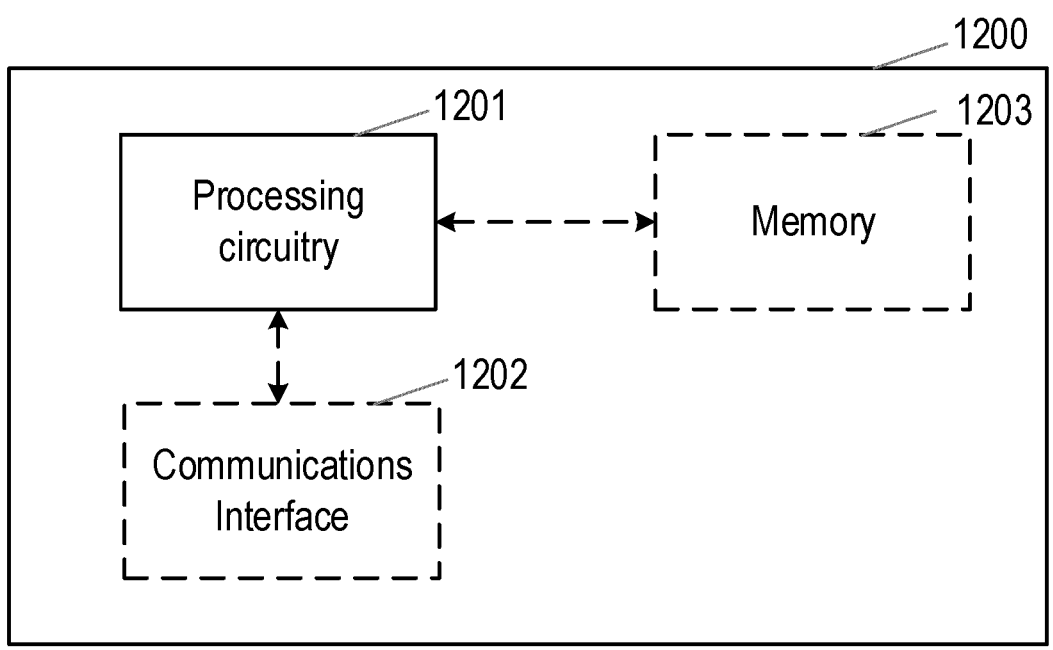
FIG. 12 shows an AF comprising processing circuitry (or logic)

FIG. 12 illustrates an AF 1200 comprising processing circuitry (or logic) 1201. The AF 1200 may comprise or be the AF 406 described above. Thus the AF 1200 can be used in a configuration process for a ULCL 410.

It will be appreciated that the AF 1200 may comprise one or more virtual machines running different software and/or processes. The AF 1200 may therefore comprise one or more servers, switches and/or storage devices and/or may comprise cloud computing infrastructure that runs the software and/or processes.

The processing circuitry 1201 controls the operation of the AF 1200 and can implement the methods described herein in relation to an AF 406. The processing circuitry 1201 can comprise one or more processors, processing units, multi-core processors or modules that are configured or programmed to control the NEF 1200 in the manner described herein. In particular implementations, the processing circuitry 1201 can comprise a plurality of software and/or hardware modules that are each configured to perform, or are for performing, individual or multiple steps of the method described herein in relation to the AF 1200 or AF 406.

Briefly, in embodiments in which an AF 406 in the CN is used in a configuration process of a ULCL 410, the processing circuitry 1201 of the AF 1200 can be configured to send a traffic influence request to a NEF 404 in the CN. The traffic influence request can comprise traffic influence information comprising an indication of a type of filter supported by the ULCL 410 to selectively route uplink data traffic from a UE 112 to a particular session anchor NF 306, 308, and an indication of a value for the indicated type of filter. The processing circuitry 1201 of the AF 1200 can also be configured to receive a response to the traffic influence request from the NEF.

In some embodiments, the AF 1200 may optionally comprise a communications interface 1202. The communications interface 1202 of the AF 1200 can be for use in communicating with other nodes, such as other virtual nodes. For example, the communications interface 1202 of the AF 1200 can be configured to transmit to and/or receive from other nodes or network functions requests, resources, information, data, signals, or similar. The processing circuitry 1201 of AF 1200 may be configured to control the communications interface 1202 of the AF 1200 to transmit to and/or receive from other nodes or network functions requests, resources, information, data, signals, or similar.

Optionally, the AF 1200 may comprise a memory 1203. In some embodiments, the memory 1203 of the AF 1200 can be configured to store program code that can be executed by the processing circuitry 1201 of the AF 1200 to perform the method described herein in relation to the AF 1200, or AF 406. Alternatively or in addition, the memory 1203 of the AF 1200, can be configured to store any requests, resources, information, data, signals, or similar that are described herein. The processing circuitry 1201 of the AF 1200 may be configured to control the memory 1203 of the AF 1200 to store any requests, resources, information, data, signals, or similar that are described herein.

Figure 13:
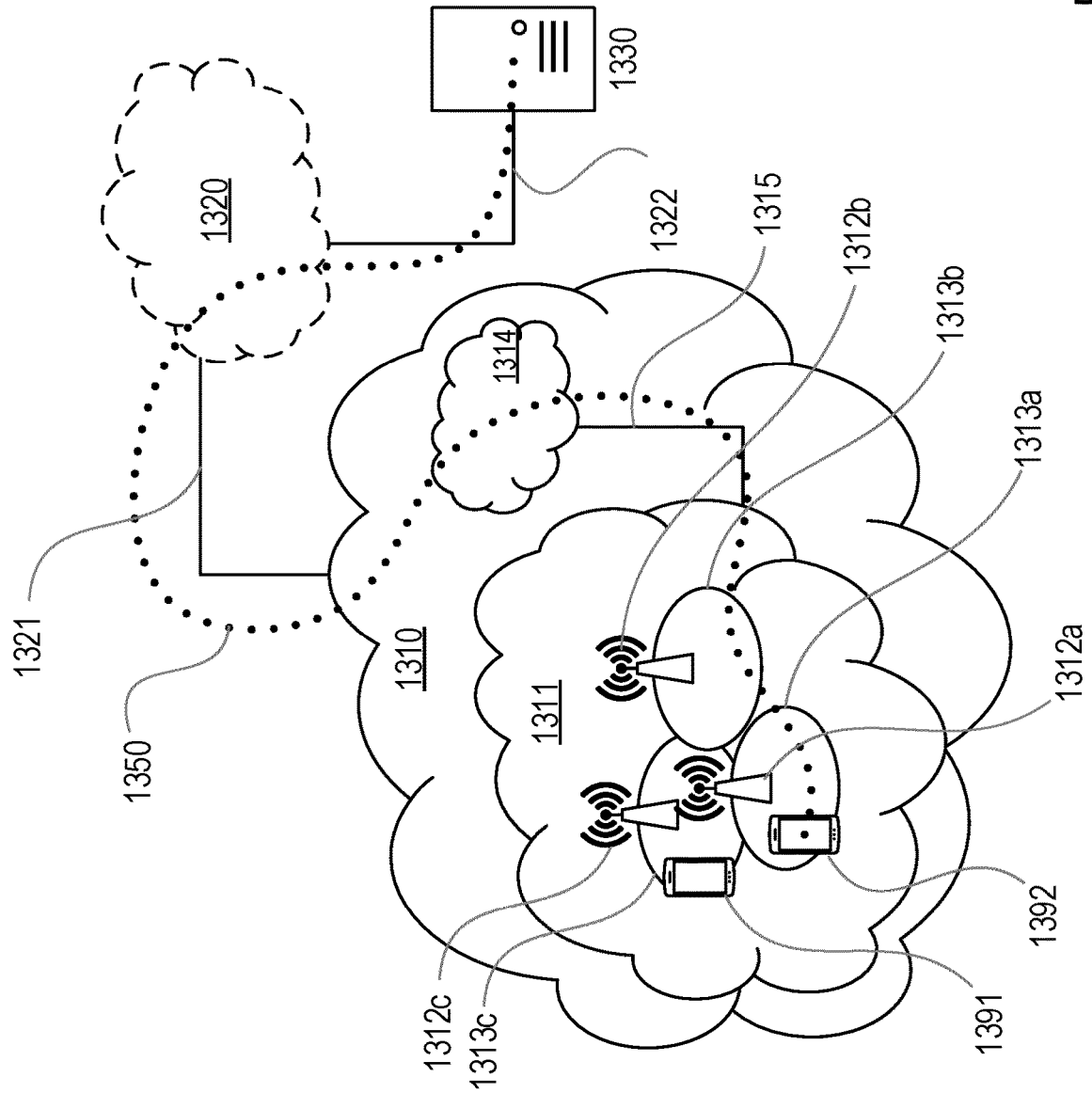
FIG. 13 schematically illustrates a telecommunication network connected via an intermediate network to a host computer.

With reference to FIG. 13, in accordance with an embodiment, a communication system includes a telecommunication network 1310, such as a 3GPP-type cellular network, which comprises an access network 1311, such as a radio access network, and a core network 1314. The access network 1311 comprises a plurality of base stations 1312a, 1312b, 1312c, such as NBs, eNBs, gNBs or other types of wireless access points, each defining a corresponding coverage area 1313a, 1313b, 1313c. Each base station 1312a, 1312b, 1312c is connectable to the core network 1314 over a wired or wireless connection 1315. A first user equipment (UE) 1391 located in coverage area 1313c is configured to wirelessly connect to, or be paged by, the corresponding base station 1312c. A second UE 1392 in coverage area 1313a is wirelessly connectable to the corresponding base station 1312a. While a plurality of UEs 1391, 1392 are illustrated in this example, the disclosed embodiments are equally applicable to a situation where a sole UE is in the coverage area or where a sole UE is connecting to the corresponding base station 1312.

The telecommunication network 1310 is itself connected to a host computer 1330, which may be embodied in the hardware and/or software of a standalone server, a cloud-implemented server, a distributed server or as processing resources in a server farm. The host computer 1330 may be under the ownership or control of a service provider, or may be operated by the service provider or on behalf of the service provider. The connections 1321, 1322 between the telecommunication network 1310 and the host computer 1330 may extend directly from the core network 1314 to the host computer 1330 or may go via an optional intermediate network 1320. The intermediate network 1320 may be one of, or a combination of more than one of, a public, private or hosted network; the intermediate network 1320, if any, may be a backbone network or the Internet; in particular, the intermediate network 1320 may comprise two or more subnetworks (not shown).

The communication system of FIG. 13 as a whole enables connectivity between one of the connected UEs 1391, 1392 and the host computer 1330. The connectivity may be described as an over-the-top (OTT) connection 1350. The host computer 1330 and the connected UEs 1391, 1392 are configured to communicate data and/or signalling via the OTT connection 1350, using the access network 1311, the core network 1314, any intermediate network 1320 and possible further infrastructure (not shown) as intermediaries. The OTT connection 1350 may be transparent in the sense that the participating communication devices through which the OTT connection 1350 passes are unaware of routing of uplink and downlink communications. For example, a base station 1312 may not or need not be informed about the past routing of an incoming downlink communication with data originating from a host computer 1330 to be forwarded (e.g., handed over) to a connected UE 1391. Similarly, the base station 1312 need not be aware of the future routing of an outgoing uplink communication originating from the UE 1391 towards the host computer 1330.

Example implementations, in accordance with an embodiment, of the UE, base station and host computer discussed in the preceding paragraphs will now be described with reference to FIG. 14. In a communication system 1400, a host computer 1410 comprises hardware 1415 including a communication interface 1416 configured to set up and maintain a wired or wireless connection with an interface of a different communication device of the communication system 1400. The host computer 1410 further comprises processing circuitry 1418, which may have storage and/or processing capabilities. In particular, the processing circuitry 1418 may comprise one or more programmable processors, application-specific integrated circuits, field programmable gate arrays or combinations of these (not shown) adapted to execute instructions. The host computer 1410 further comprises software 1411, which is stored in or accessible by the host computer 1410 and executable by the processing circuitry 1418. The software 1411 includes a host application 1412. The host application 1412 may be operable to provide a service to a remote user, such as a UE 1430 connecting via an OTT connection 1450 terminating at the UE 1430 and the host computer 1410. In providing the service to the remote user, the host application 1412 may provide user data which is transmitted using the OTT connection 1450.

The communication system 1400 further includes a base station 3130 provided in a telecommunication system and comprising hardware 3135 enabling it to communicate with the host computer 1410 and with the UE 1430. The hardware 3135 may include a communication interface 3136 for setting up and maintaining a wired or wireless connection with an interface of a different communication device of the communication system 1400, as well as a radio interface 3137 for setting up and maintaining at least a wireless connection 1470 with a UE 1430 located in a coverage area (not shown in FIG. 14) served by the base station 3130. The communication interface 3136 may be configured to facilitate a connection 1460 to the host computer 1410. The connection 1460 may be direct or it may pass through a core network (not shown in FIG. 14) of the telecommunication system and/or through one or more intermediate networks outside the telecommunication system. In the embodiment shown, the hardware 3135 of the base station 3130 further includes processing circuitry 3138, which may comprise one or more programmable processors, application-specific integrated circuits, field programmable gate arrays or combinations of these (not shown) adapted to execute instructions. The base station 3130 further has software 3131 stored internally or accessible via an external connection.

The communication system 1400 further includes the UE 1430 already referred to. Its hardware 1435 may include a radio interface 1437 configured to set up and maintain a wireless connection 1470 with a base station serving a coverage area in which the UE 1430 is currently located. The hardware 1435 of the UE 1430 further includes processing circuitry 1438, which may comprise one or more programmable processors, application-specific integrated circuits, field programmable gate arrays or combinations of these (not shown) adapted to execute instructions. The UE 1430 further comprises software 1431, which is stored in or accessible by the UE 1430 and executable by the processing circuitry 1438. The software 1431 includes a client application 1413. The client application 1413 may be operable to provide a service to a human or non-human user via the UE 1430, with the support of the host computer 1410. In the host computer 1410, an executing host application 1412 may communicate with the executing client application 1413 via the OTT connection 1450 terminating at the UE 1430 and the host computer 1410. In providing the service to the user, the client application 1413 may receive request data from the host application 1412 and provide user data in response to the request data. The OTT connection 1450 may transfer both the request data and the user data. The client application 1413 may interact with the user to generate the user data that it provides.

Figure 14:
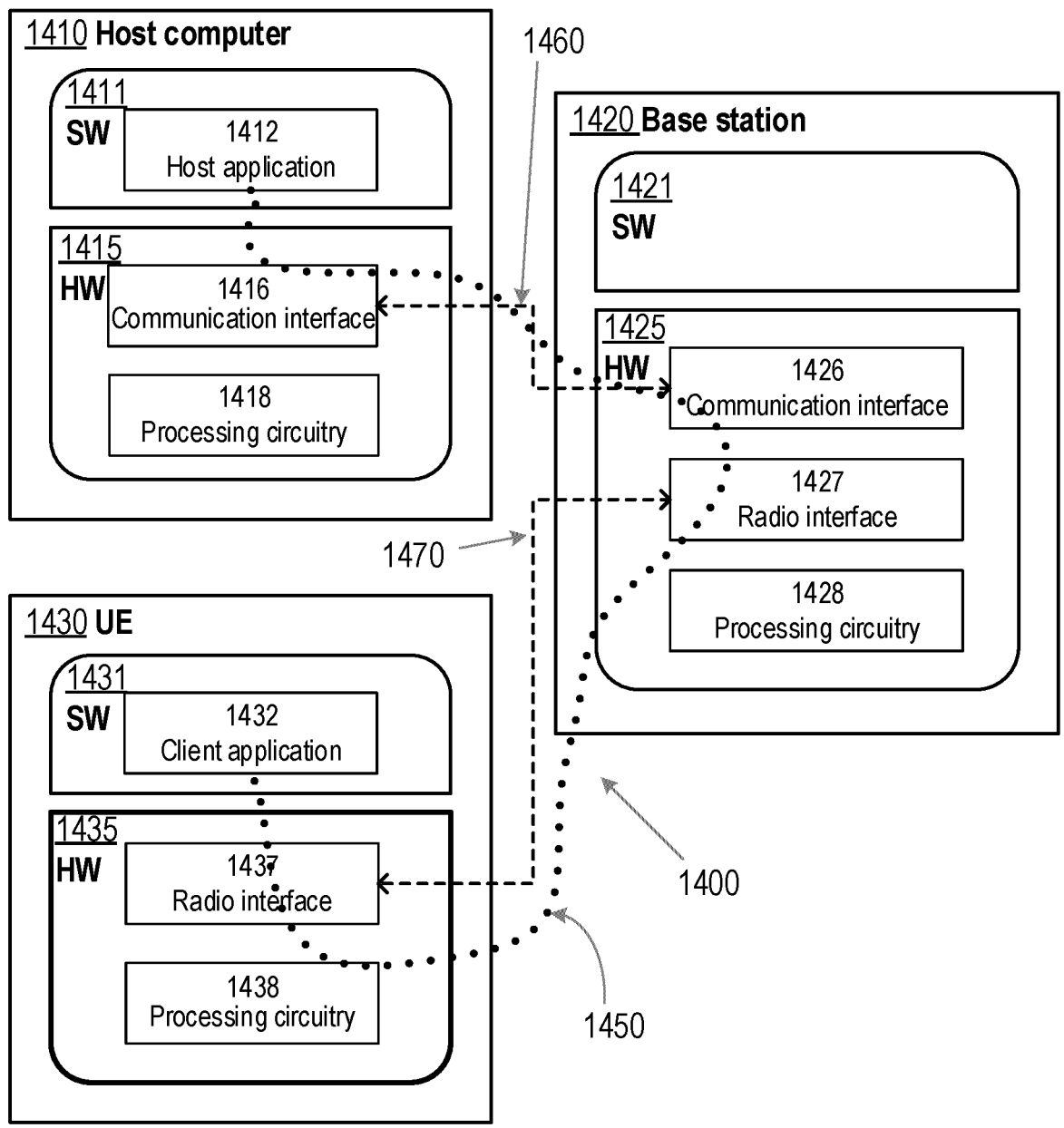
FIG. 14 is a generalised block diagram of a host computer communicating via a base station with a user equipment over a partially wireless connection.

It is noted that the host computer 1410, base station 3130 and UE 1430 illustrated in FIG. 14 may be identical to the host computer 1140, one of the base stations 1312a, 1312b, 1312c and one of the UEs 1391, 1392 of FIG. 13, respectively. This is to say, the inner workings of these entities may be as shown in FIG. 14 and independently, the surrounding network topology may be that of FIG. 13.

In FIG. 14, the OTT connection 1450 has been drawn abstractly to illustrate the communication between the host computer 1410 and the use equipment 1430 via the base station 3130, without explicit reference to any intermediary devices and the precise routing of messages via these devices. Network infrastructure may determine the routing, which it may be configured to hide from the UE 1430 or from the service provider operating the host computer 1410, or both. While the OTT connection 1450 is active, the network infrastructure may further take decisions by which it dynamically changes the routing (e.g., on the basis of load balancing consideration or reconfiguration of the network).

A measurement procedure may be provided for the purpose of monitoring data rate, latency and other factors. There may further be an optional network functionality for reconfiguring the OTT connection 1450 between the host computer 1410 and UE 1430, in response to variations in the measurement results. The measurement procedure and/or the network functionality for reconfiguring the OTT connection 1450 may be implemented in the software 1411 of the host computer 1410 or in the software 1431 of the UE 1430, or both. In embodiments, sensors (not shown) may be deployed in or in association with communication devices through which the OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of the OTT connection 1450 may include message format, retransmission settings, preferred routing etc.; the reconfiguring need not affect the base station 3130, and it may be unknown or imperceptible to the base station 3130. Such procedures and functionalities may be known and practiced in the art. In certain embodiments, measurements may involve proprietary UE signalling facilitating the host computer's 1410 measurements of throughput, propagation times, latency and the like. The measurements may be implemented in that the software 1411, 1431 causes messages to be transmitted, in particular empty or 'dummy' messages, using the OTT connection 1450 while it monitors propagation times, errors etc.

Figure 15:
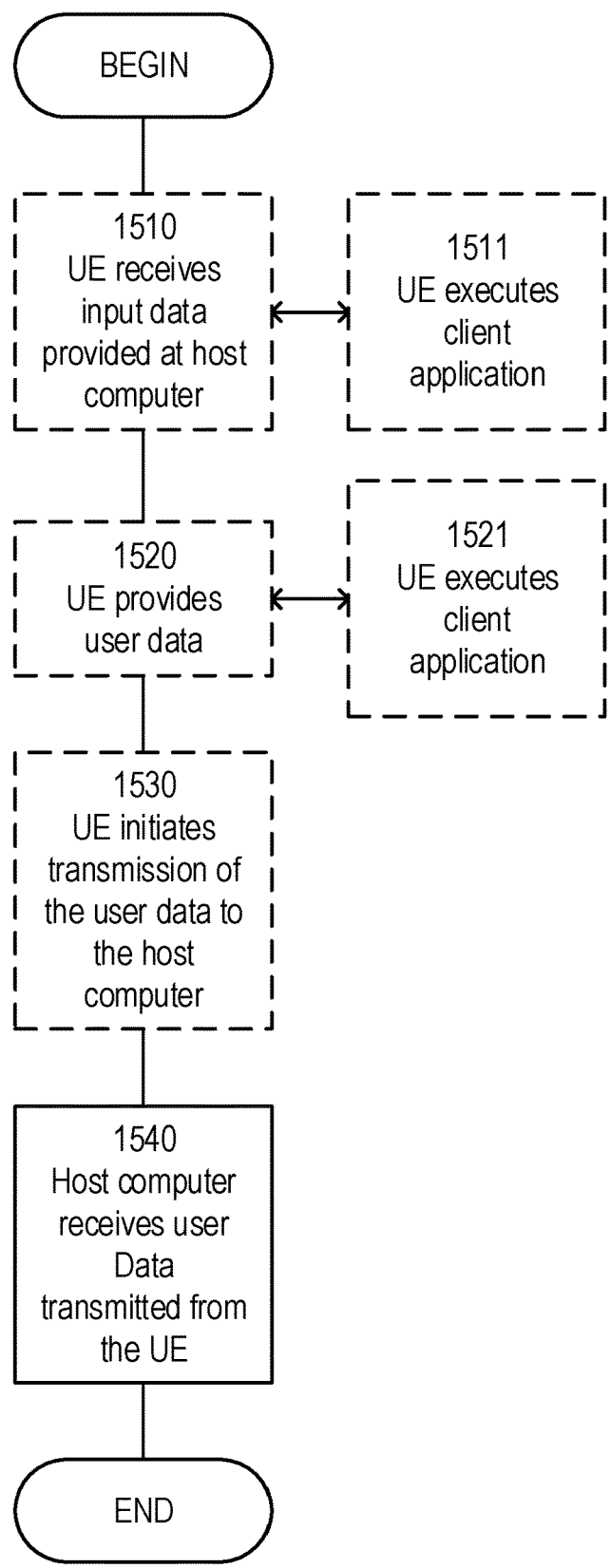
FIGS. 15 and 16 are flowcharts illustrating methods implemented in a communication system including a host computer, a base station and a user equipment.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 14 will be included in this section. In an optional first step 1510 of the method, the UE receives input data provided by the host computer. Additionally or alternatively, in an optional second step 1520, the UE provides user data. In an optional substep 1521 of the second step 1520, the UE provides the user data by executing a client application. In a further optional substep 1511 of the first step 1510, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1530, transmission of the user data to the host computer. In a fourth step 1540 of the method, the host computer receives the user data transmitted from the UE, in accordance with the teachings of the embodiments described throughout this disclosure.

Figure 16:
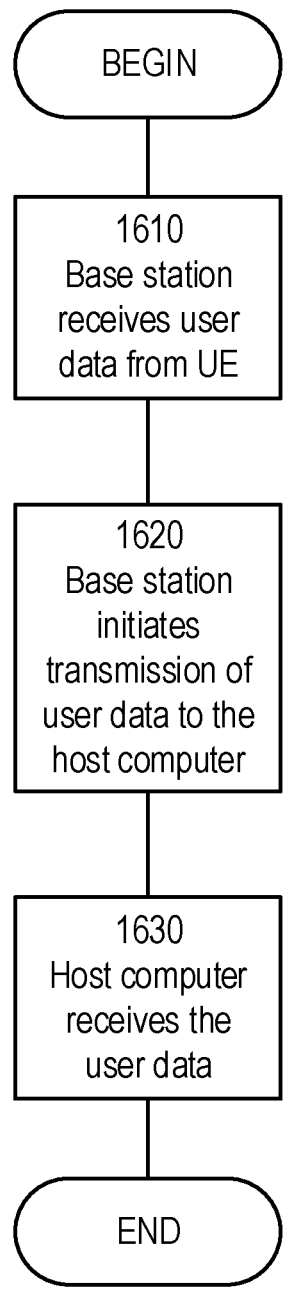

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In an optional first step 1610 of the method, the base station receives user data from the UE. In an optional second step 1620, the base station initiates transmission of the received user data to the host computer. The base station can transmit the received user data via a ULCL registered and/or configured in accordance with the teachings of the embodiments described throughout this disclosure. In a third step 1630, the host computer receives the user data carried in the transmission initiated by the base station.

Figure 17:
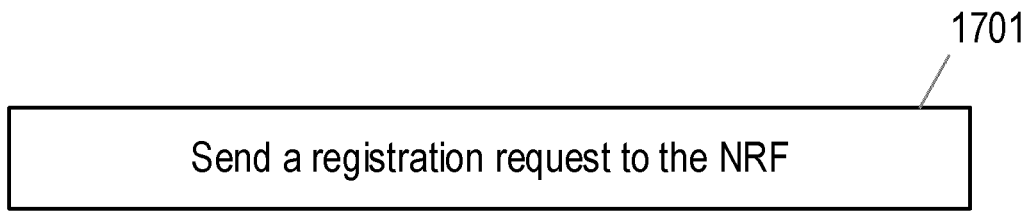
FIG. 17 is a flow chart illustrating a method by a first network function in a core network.

FIG. 17 is a flow chart illustrating a method by a first NF (e.g. a UPF, such as a ULCL) in a core network. The method in FIG. 17 is for registering the first NF at a NRF of the CN. The first NF is to selectively route uplink data traffic in one or more data sessions from a UE to one of a plurality of session anchor NFs. The method comprises, in step 1701, sending a registration request to the NRF. The registration request comprises registration information. The registration information comprises an indication of a type of filter supported by the first NF to selectively route uplink data traffic from a UE to a particular session anchor NF, and an indication of a value for the indicated type of filter. In some embodiments, the registration information further comprises an identity for the first NF and an address for the first NF. The types of filter may relate to any one or more of an application identity, a subnetwork identity, an address prefix, and a location.

In some embodiments, the method further comprises receiving a response to the registration request from the NRF.

In some embodiments, the method further comprises the first NF sending an association request to a SMF. The association request is sent to associate the first NF with the SMF. The association request comprises association information comprising the indication of the type of filter supported by the first NF and the indication of the value for the indicated type of filter. In some embodiments, the method further comprises receiving a response to the association request from the SMF.

Figure 18:
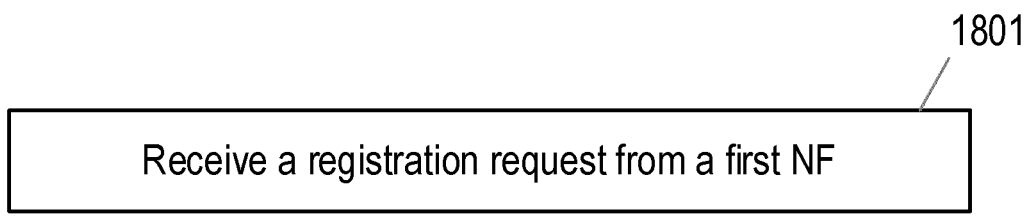
FIG. 18 is a flow chart illustrating a method by a network repository function in a core network.

FIG. 18 is a flow chart illustrating a method by a NRF in a core network. The NRF is in a core network of a communication network, and the method in FIG. 18 is for registering a first NF (e.g. a UPF, such as a ULCL) that is to selectively route uplink data traffic in one or more data sessions from a UE to one of a plurality of session anchor NFs. The method by the NRF comprises, in step 1801, receiving a registration request from the first NF. The registration request comprises registration information. The registration information comprises an indication of a type of filter supported by the first NF to selectively route uplink data traffic from a UE to a particular session anchor NF, and an indication of a value for the indicated type of filter. In some embodiments, the registration information further comprises an identity for the first NF and an address for the first NF. The types of filter may relate to any one or more of an application identity, a subnetwork identity, an address prefix, and a location.

In some embodiments, the method further comprises the NRF storing the received registration information.

In some embodiments, the NRF can send a response to the registration request to the first NF.

In some embodiments, the NRF may also receive an update request from a SMF. The update request can comprise update information comprising the indication of the type of filter supported by the first NF and the indication of the value for the indicated type of filter. In these embodiments the update information may further comprise an identity for the SMF. In these embodiments the method may further comprise sending a response to the update request to the SMF.

Figure 19:
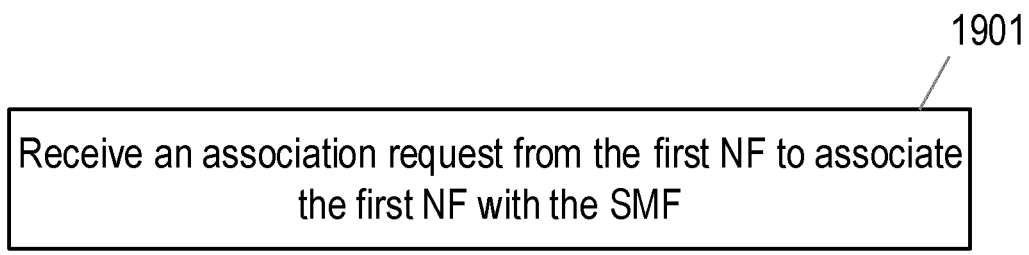
FIG. 19 is a flow chart illustrating a method by a session management function in a core network.

FIG. 19 is a flow chart illustrating a method by a SMF. The SMF is in a core network. The method in FIG. 19 is for associating with a first NF (e.g. a UPF, such as a ULCL) that is to selectively route uplink data traffic in one or more data sessions from a UE to one of a plurality of session anchor NFs. In step 1901 the method comprises receiving an association request from the first NF. The association request is a request to associate the first NF with the SMF. The association request comprises association information comprising an indication of a type of filter supported by the first NF to selectively route uplink data traffic from a UE to a particular session anchor NF, and an indication of a value for the indicated type of filter. In some embodiments, the association information may further comprise an identity for the first NF. In some embodiments, the types of filter can relate to any one or more of: an application identity, a subnetwork identity, an address prefix, and a location.

In some embodiments, the method may further comprise the SMF storing the received association information.

In some embodiments, the method may further comprise the SMF sending an update request to a NRF. The update request can comprise update information comprising the indication of the type of filter supported by the first NF and the indication of the value for the indicated type of filter. In these embodiments, the update information may further comprise an identity for the SMF. In these embodiments, the method may further comprise the SMF receiving a response to the update request from the NRF.

In some embodiments, the SMF may send a response to the association request to the first NF.

Figure 20:
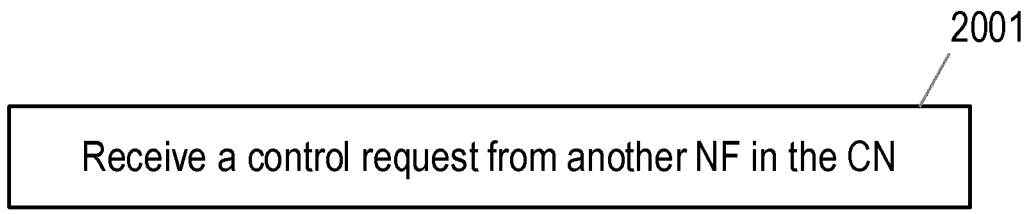
FIG. 20 is a flow chart illustrating another method by a first network function in a core network.

FIG. 20 is a flow chart illustrating another method by a first NF (e.g. a UPF, such as a ULCL) in a core network. The method in FIG. 20 is for configuring the first NF. The first NF is to selectively route uplink data traffic in one or more data sessions from a UE to one of a plurality of session anchor NFs. The method comprises, in step 2001, receiving a control request from another NF in the core network. The 'another NF' can be a SMF or a NEF. The control request comprises control information that comprises an indication of a type of filter to be used by the first NF to selectively route uplink data traffic from a UE to a particular session anchor NF, and an indication of a value for the indicated type of filter. In some embodiments, the control information can further comprise a routing indication comprising routing information and/or a routing profile for data traffic and a default routing indication comprising routing information for uplink data traffic that does not match the indicated value for the indicated type of filter. In these embodiments, the control information may further comprise a downlink routing indication that indicates a radio access node in a RAN of the communication network for downlink data traffic for the UE. In alternative embodiments, the control information can further comprise QoS information for data traffic. In some embodiments, the control information further comprises a Tunnel Endpoint ID (TEID) of the first NF.

In some embodiments, the method further comprises the first NF sending a response to the control request to the other NF.

In some embodiments, the method further comprises registering the first NF at a NRF according to the method in FIG. 17.

Figure 21:
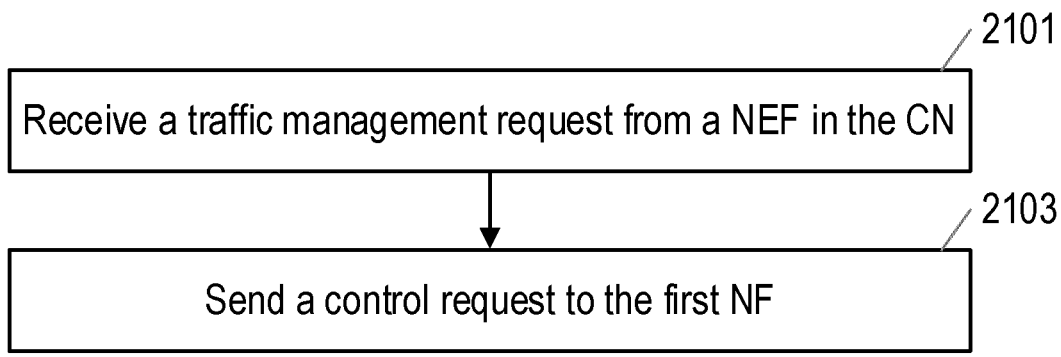
FIG. 21 is a flow chart illustrating another method by a session management function in a core network.

FIG. 21 is a flow chart illustrating another method by a SMF in a core network of a communication network. The method in FIG. 21 is for configuring a first NF (e.g. a UPF, such as a ULCL) that is to selectively route uplink data traffic in one or more data sessions from a UE to one of a plurality of session anchor NFs. In step 2101 the method comprises receiving a traffic management request from a NEF in the CN. The traffic management request comprises traffic management information comprising an indication of a type of filter to be used by the first NF to selectively route uplink data traffic from a UE to a particular session anchor NF and an indication of a value for the indicated type of filter.

In step 2103, the SMF sends a control request to the first NF. The control request comprises control information comprising the indication of the type of filter and the indication of the value for the indicated type of filter.

In some embodiments, the traffic management information and/or the control information further comprises routing information and/or a routing profile for data traffic and a default routing indication comprising routing information for uplink data traffic that does not match the indicated value for the indicated type of filter. In these embodiments, the control information can further comprise a downlink routing indication that indicates a radio access node in a RAN of the communication network for downlink data traffic for the UE.

In alternative embodiments, the traffic management information and/or the control information further comprises QoS information for data traffic.

In some embodiments, the control information further comprises a Tunnel Endpoint ID (TEID) of the first NF.

In some embodiments, the method further comprises receiving a response to the control request from the first NF.

In some embodiments, the method further comprises the SMF sending a response to the received traffic management request to the NEF. The response is sent after receiving the response to the control request from the first NF.

In some embodiments, the method further comprises determining whether the SMF has the control information for the first NF after receiving the traffic management request. In response to determining that the SMF does not have the control information for the first NF, the SMF can send a NF discovery request to a NRF in the CN in order to determine information about the first NF. The NF discovery request can comprise the received traffic management information. The SMF receives a response to the NF discovery request from the NRF, and the response comprises an address for the first NF.

In some embodiments, the method further comprises associating with the first NF according to the method in FIG. 19.

Figure 22:
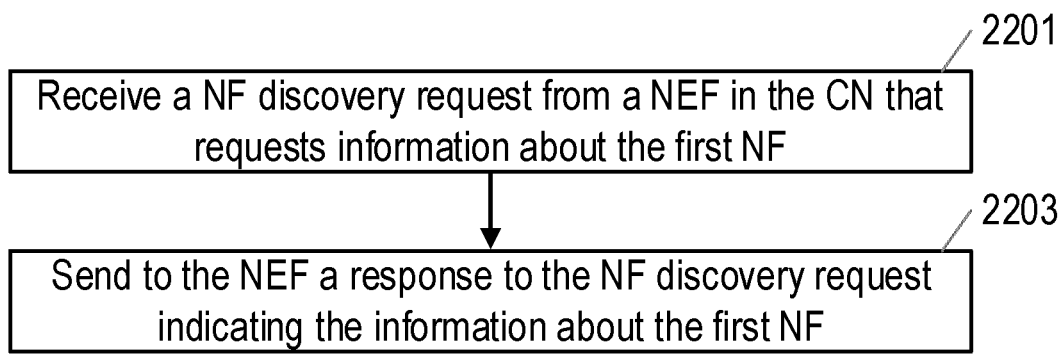
FIG. 22 is a flow chart illustrating another method by a network repository function in a core network.

FIG. 22 is a flow chart illustrating another method by a NRF in a core network of a communication network. The method is for configuring a first NF (e.g. a UPF, such as a ULCL) that is registered with the NRF. The first NF is to selectively route uplink data traffic in one or more data sessions from a UE to one of a plurality of session anchor NFs. In step 2201 the method comprises receiving a NF discovery request from a NEF in the CN that requests information about the first NF. The NF discovery request comprises NF discovery information comprising an indication of a type of filter supported by the first NF to selectively route uplink data traffic from a UE to a particular session anchor NF and an indication of a value for the indicated type of filter.

In step 2203, the NRF sends a response to the NF discovery request indicating the information about the first NF to the NEF.

In some embodiments, the information about the first NF sent in the response to the NEF comprises an address of a SMF in the CN that is to configure the first NF.

In some embodiments, the method can further comprise receiving a NF discovery request from the SMF that requests information about the first NF. The NF discovery request comprises information corresponding to the received NF discovery information. The NRF can send a response to the NF discovery request from the NRF, with the response comprising an address for the first NF.

In some embodiments, the information about the first NF sent in the response to the NEF comprises an address of the first NF.

In some embodiments, the NRF can also register the first NF at the NRF according to the method in FIG. 18.

Figure 23:
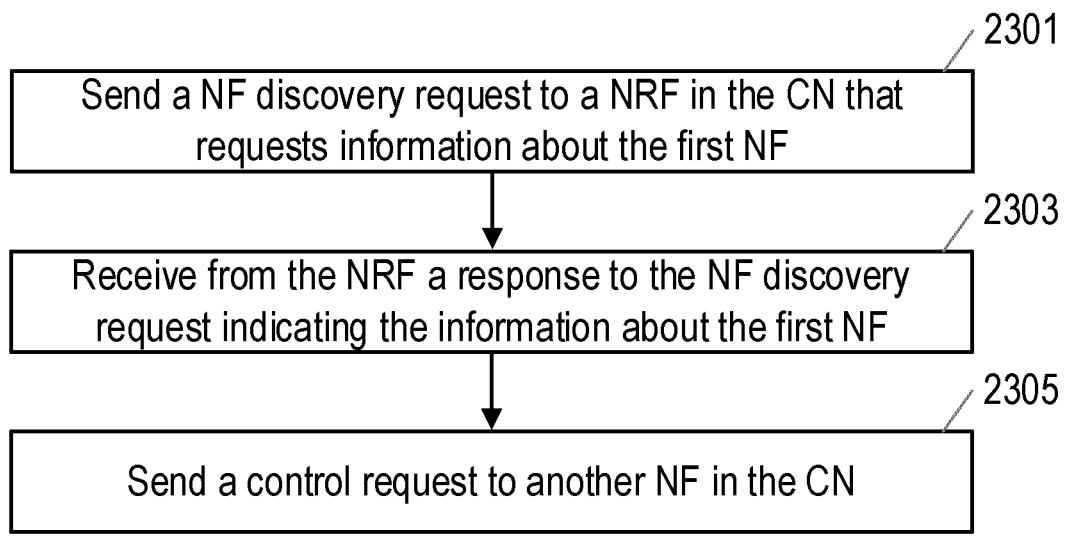
FIG. 23 is a flow chart illustrating a method by a network exposure function in a core network.

FIG. 23 is a flow chart illustrating a method by a NEF in a core network of a communication network. The NEF is to configure a first NF (e.g. a UPF, such as a ULCL) that is to selectively route uplink data traffic in one or more data sessions from a UE to one of a plurality of session anchor NFs. In step 2301, the method comprises sending a NF discovery request to a NRF in the CN that requests information about the first NF. The NF discovery request comprises NF discovery information comprising an indication of a type of filter supported by the first NF to selectively route uplink data traffic from a UE to a particular session anchor NF, and an indication of a value for the indicated type of filter.

In step 2303, the NEF receives a response to the NF discovery request indicating the information about the first NF from the NRF.

In step 2305, the NEF sends a control request to another NF in the CN. The control request comprises control information that comprises the indication of the type of filter supported by the first NF and the indication of the value for the indicated type of filter. In some embodiments, the NEF receives a response to the control request from the other NF.

In some embodiments, the NF discovery request requests an address for a SMF that is to configure the first NF. In these embodiments, the information about the first NF received in the response from the NRF comprises an address of the SMF in the CN that is to configure the first NF. In these embodiments, the other NF is the SMF having the address indicated in the received response to the NF discovery request.

In alternative embodiments, the NF discovery request requests an address for the first NF, and the information about the first NF received in the response from the NRF comprises an address of the first NF. In these embodiments, the other NF is the first NF having the address indicated in the received response to the NF discovery request. In these embodiments, the control service information may further comprise a TEID of the first NF.

In some embodiments, the control information further comprises a routing indication comprising routing information and/or a routing profile for data traffic; and a default routing indication comprising routing information for uplink data traffic that does not match the indicated value for the indicated type of filter. In these embodiments, the control information can further comprise a downlink routing indication that indicates a radio access node in a RAN of the communication network for downlink data traffic for the UE.

In some embodiments, the control information can further comprise QoS information for data traffic.

In some embodiments, the method by the NEF further comprises, prior to step 2301, receiving a traffic influence request from an AF in the CN. The traffic influence request comprises traffic influence information comprising the indication of the type of filter to be used by the first NF and the indication of the value for the indicated type of filter. The NEF can then send a response to the traffic influence request to the AF. In these embodiments, the traffic influence information can further comprise a routing indication comprising routing information and/or a routing profile for data traffic, and a default routing indication comprising routing information for uplink data traffic that does not match the indicated value for the indicated type of filter. In these embodiments, the traffic influence information can further comprise a downlink routing indication that indicates a radio access node in a RAN of the communication network for downlink data traffic for the UE. In alternative embodiments, the traffic influence information can further comprise QoS information for data traffic.

Figure 24:
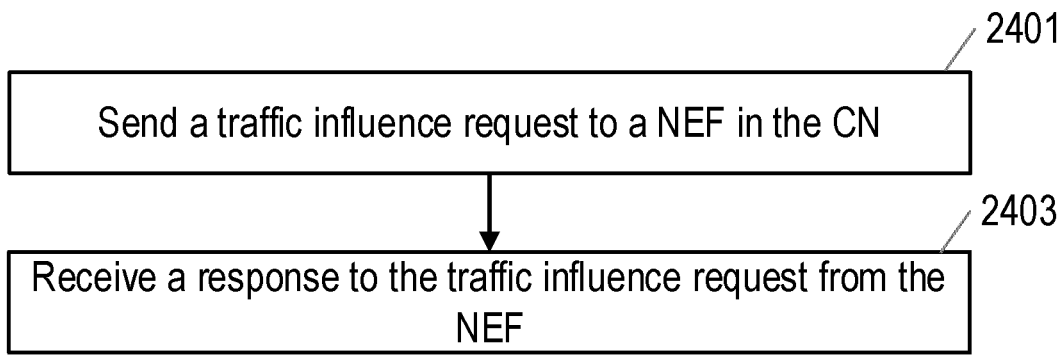
FIG. 24 is a flow chart illustrating a method by an application function in a core network.

FIG. 24 is a flow chart illustrating a method by an AF in a core network of a communication network. The method is for configuring a first NF (e.g. a UPF, such as a ULCL) that is to selectively route uplink data traffic in one or more data sessions from a UE to one of a plurality of session anchor NFs. In step 2401, the AF sends a traffic influence request to a NEF in the CN. The traffic influence request comprises traffic influence information comprising an indication of a type of filter supported by the first NF to selectively route uplink data traffic from a UE to a particular session anchor NF, and an indication of a value for the indicated type of filter.

In step 2403, the AF receives a response to the traffic influence request from the NEF.

In some embodiments, the traffic influence information can further comprise a routing indication comprising routing information and/or a routing profile for data traffic, and a default routing indication comprising routing information for uplink data traffic that does not match the indicated value for the indicated type of filter. In these embodiments, the traffic influence information may further comprise a downlink routing indication that indicates a radio access node in a RAN of the communication network for downlink data traffic for the UE. In alternative embodiments, the traffic influence information further comprises QoS information for data traffic.

Figure 25:
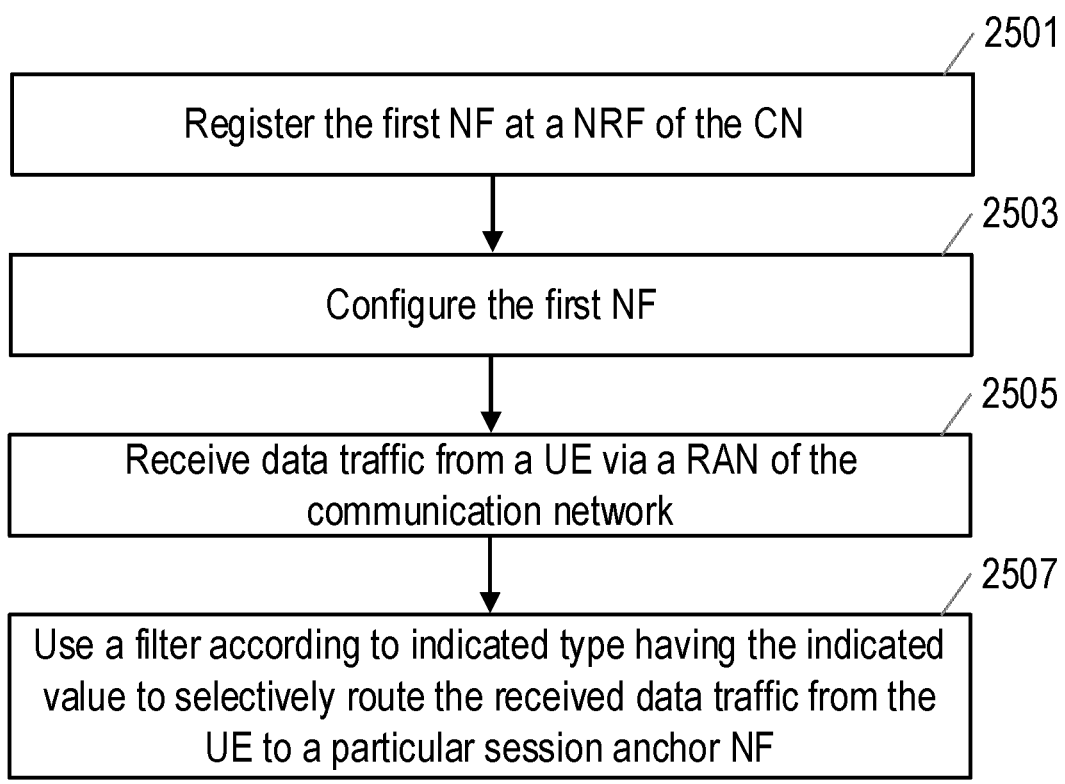
FIG. 25 is a flow chart illustrating another method by a first network function in a core network.

FIG. 25 is a flow chart illustrating another method by a first NF (e.g. a UPF, such as a ULCL) in a core network of a communication network. In step 2501, the first NF is registered at a NRF of the CN according to the method of FIG. 17.

In step 2503, the first NF is configured according to the method of FIG. 20.

In step 2505, the first NF receives data traffic from a UE via a RAN of the communication network.

In step 2507, the first NF uses a filter according to indicated type having the indicated value to selectively route the received data traffic from the UE to a particular session anchor NF.

Embodiments of a service-based ULCL as described herein are capable of handling and executing TM actions for a group of PDU sessions in a combined way. This is useful for use cases such as Edge Computing, where traffic shall be redirected on a per-application, or per-subnetwork basis.

Embodiments of a ULCL as described herein allow ULCLs to be associated to different filter types and filter values, which permits different ULCL instances per app-ID, subnetwork, location, etc. allowing the proper ULCL instance to be selected based on the desired filter type and value.

Embodiments of a ULCL as described herein can be deployed in the N6 interface after the UPF to handle IP traffic between the UPFs and the Data Networks.

Embodiments of a service-based ULCL as described herein are much more efficient than the ULCL currently defined in 3GPP in terms of signalling load, performance and energy consumption.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

EMBODIMENT STATEMENTS

1. A method by a first network function, NF, in a core network, CN, of a communication network for registering the first NF at a network repository function, NRF, of the CN, wherein the first NF is to selectively route uplink data traffic in one or more data sessions from a user equipment, UE, to one of a plurality of session anchor NFs, wherein the method by the first NF comprises:
 sending a registration request to the NRF, wherein the registration request comprises registration information comprising:
  an indication of a type of filter supported by the first NF to selectively route uplink data traffic from a UE to a particular session anchor NF; and
  an indication of a value for the indicated type of filter.

2. A method as defined in statement 1, wherein the registration information further comprises an identity for the first NF and an address for the first NF.

3. A method as defined in statement 1 or 2, wherein the method further comprises:
 receiving a response to the registration request from the NRF.

4. A method as defined in statement 1, 2 or 3, wherein the types of filter relate to any one or more of: an application identity, a subnetwork identity, an address prefix, and a location.

5. A method as defined in any of statements 1-4, wherein the method further comprises:
 sending an association request to a session management function, SMF, to associate the first NF with the SMF, wherein the association request comprises association information comprising the indication of the type of filter supported by the first NF and the indication of the value for the indicated type of filter.

6. A method as defined in statement 5, wherein the method further comprises:

receiving a response to the association request from the SMF.

7. A method by a network repository function, NRF, in a core network, CN, of a communication network for registering a first network function, NF, that is to selectively route uplink data traffic in one or more data sessions from a user equipment, UE, to one of a plurality of session anchor NFs, wherein the method by the NRF comprises:
  receiving a registration request from the first NF, wherein the registration request comprises registration information comprising:
    an indication of a type of filter supported by the first NF to selectively route uplink data traffic from a UE to a particular session anchor NF; and
    an indication of a value for the indicated type of filter.

8. A method as defined in statement 7, wherein the registration information further comprises an identity for the first NF and an address for the first NF.

9. A method as defined in statement 7 or 8, wherein the method further comprises:
  storing the received registration information.

10. A method as defined in statement 7, 8 or 9, wherein the method further comprises:
  sending a response to the registration request to the first NF.

11. A method as defined in any of statements 7-10 wherein the types of filter relate to any one or more of: an application identity, a subnetwork identity, an address prefix, and a location.

12. A method as defined in any of statements 7-11 wherein the method further comprises:
  receiving an update request from a session management function, SMF, wherein the update request comprises update information comprising the indication of the type of filter supported by the first NF and the indication of the value for the indicated type of filter.

13. A method as defined in statement 12, wherein the update information further comprises an identity for the SMF.

14. A method as defined in statement 12 or 13, wherein the method further comprises sending a response to the update request to the SMF.

15. A method by a session management function, SMF, in a core network, CN, of a communication network for associating with a first network function, NF, that is to selectively route uplink data traffic in one or more data sessions from a user equipment, UE, to one of a plurality of session anchor NFs, wherein the method by the SMF comprises:
  receiving an association request from the first NF to associate the first NF with the SMF, wherein the association request comprises association information comprising:
    an indication of a type of filter supported by the first NF to selectively route uplink data traffic from a UE to a particular session anchor NF; and
    an indication of a value for the indicated type of filter.

16. A method as defined in statement 15, wherein the association information further comprises an identity for the first NF.

17. A method as defined in statement 15 or 16, wherein the method further comprises:
  storing the received association information.

18. A method as defined in any of statements 15-17, wherein the types of filter relate to any one or more of: an application identity, a subnetwork identity, an address prefix, and a location.

19. A method as defined in any of statements 15-18 wherein the method further comprises sending an update request to a network repository function, NRF, wherein the update request comprises update information comprising the indication of the type of filter supported by the first NF and the indication of the value for the indicated type of filter.

20. A method as defined in statement 19, wherein the update information further comprises an identity for the SMF.

21. A method as defined in statement 19 or 20, wherein the method further comprises receiving a response to the update request from the NRF.

22. A method as defined in any of statements 15-21 wherein the method further comprises sending a response to the association request to the first NF.

23. A method by a first network function, NF, in a core network, CN, of a communication network for configuring the first NF, wherein the first NF is to selectively route uplink data traffic in one or more data sessions from a user equipment, UE, to one of a plurality of session anchor NFs, wherein the method by the first NF comprises:
  receiving a control request from another NF in the CN, wherein the control request comprises control information that comprises:
    an indication of a type of filter to be used by the first NF to selectively route uplink data traffic from a UE to a particular session anchor NF; and
    an indication of a value for the indicated type of filter.

24. A method as defined in statement 23, wherein the control information further comprises:
  a routing indication comprising routing information and/or a routing profile for data traffic; and
  a default routing indication comprising routing information for uplink data traffic that does not match the indicated value for the indicated type of filter.

25. A method as defined in statement 24, wherein the control information further comprises a downlink routing indication that indicates a radio access node in a radio access network, RAN, of the communication network for downlink data traffic for the UE.

26. A method as defined in statement 23, wherein the control information further comprises:
  quality of service, QoS, information for data traffic.

27. A method as defined in any of statements 23-26, wherein the control information further comprises a Tunnel Endpoint ID, TEID, of the first NF.

28. A method as defined in any of statements 23-27, wherein the method further comprises:
  sending a response to the control request to the another NF.

29. A method as defined in any of statements 23-28, wherein the another NF is a session management function, SMF, or a network exposure function, NEF.

30. A method as claimed in any of statements 23-29, wherein the method further comprises registering the first NF at a network repository function, NRF, according to the method in any of statements 1-6.

31. A method by a session management function, SMF, in a core network, CN, of a communication network for configuring a first network function, NF, that is to selectively route uplink data traffic in one or more data sessions from a user equipment, UE, to one of a plurality of session anchor NFs, wherein the method by the SMF comprises:
  receiving a traffic management request from a network exposure function, NEF, in the CN, wherein the traffic management request comprises traffic management information comprising:

an indication of a type of filter to be used by the first NF to selectively route uplink data traffic from a UE to a particular session anchor NF; and
an indication of a value for the indicated type of filter; and
sending a control request to the first NF, wherein the control request comprises control information comprising:
the indication of the type of filter to be used by the first NF to selectively route uplink data traffic from a UE to a particular session anchor NF; and
the indication of the value for the indicated type of filter.

32. A method as defined in statement 31, wherein the traffic management information and/or the control information further comprises:
routing information and/or a routing profile for data traffic; and
a default routing indication comprising routing information for uplink data traffic that does not match the indicated value for the indicated type of filter.

33. A method as defined in statement 32, wherein the control information further comprises a downlink routing indication that indicates a radio access node in a radio access network, RAN, of the communication network for downlink data traffic for the UE.

34. A method as defined in statement 31, wherein the traffic management information and/or the control information further comprises:
quality of service, QoS, information for data traffic.

35. A method as defined in any of statements 31-34, wherein the control information further comprises a Tunnel Endpoint ID, TEID, of the first NF.

36. A method as defined in any of statements 31-35, wherein the method further comprises:
receiving a response to the control request from the first NF.

37. A method as defined in statement 31, wherein the method further comprises:
after receiving the response to the control request from the first NF, sending, to the NEF, a response to the received traffic management request.

38. A method as defined in any of statements 31-37, wherein the method further comprises:
after receiving the traffic management request, determining whether the SMF has the control information for the first NF;
responsive to determining that the SMF does not have the control information for the first NF, sending a NF discovery request to a network repository function, NRF, in the CN, in order to determine information about the first NF, the NF discovery request comprising the received traffic management information; and
receiving a response to the NF discovery request from the NRF, the response comprising an address for the first NF.

39. A method as claimed in any of statements 30-38, wherein the method further comprises associating with the first NF according to the method in any of statements 15-22.

40. A method by a network repository function, NRF, in a core network, CN, of a communication network for configuring a first network function, NF, that is registered with the NRF, wherein the first NF is to selectively route uplink data traffic in one or more data sessions from a user equipment, UE, to one of a plurality of session anchor NFs, wherein the method by the NRF comprises:

receiving a NF discovery request from a network exposure function, NEF, in the CN that requests information about the first NF, wherein the NF discovery request comprises NF discovery information comprising:
an indication of a type of filter supported by the first NF to selectively route uplink data traffic from a UE to a particular session anchor NF; and
an indication of a value for the indicated type of filter; and
sending, to the NEF, a response to the NF discovery request indicating the information about the first NF.

41. A method as defined in statement 40, wherein the information about the first NF sent in the response to the NEF comprises an address of a session management function, SMF, in the CN that is to configure the first NF.

42. A method as defined in statement 40, wherein the method further comprises:
receiving a NF discovery request from the SMF that requests information about the first NF, the NF discovery request comprising information corresponding to the received NF discovery information; and
sending a response to the NF discovery request from the NRF, the response comprising an address for the first NF.

43. A method as defined in statement 40, wherein the information about the first NF sent in the response to the NEF comprises an address of the first NF.

44. A method as claimed in any of statements 40-43, wherein the method further comprises registering the first NF at the NRF according to the method in any of statements 7-14.

45. A method by a network exposure function, NEF, in a core network, CN, of a communication network for configuring a first network function, NF, wherein the first NF is to selectively route uplink data traffic in one or more data sessions from a user equipment, UE, to one of a plurality of session anchor NFs, wherein the method by the NEF comprises:
sending a NF discovery request to a network repository function, NRF, in the CN that requests information about the first NF, wherein the NF discovery request comprises NF discovery information comprising:
an indication of a type of filter supported by the first NF to selectively route uplink data traffic from a UE to a particular session anchor NF; and
an indication of a value for the indicated type of filter;
receiving, from the NRF, a response to the NF discovery request indicating the information about the first NF; and
sending a control request to another NF in the CN, wherein the control request comprises control information that comprises:
the indication of the type of filter supported by the first NF to selectively route uplink data traffic from a UE to a particular session anchor NF; and
the indication of the value for the indicated type of filter.

46. A method as defined in statement 45, wherein the NF discovery request requests an address for a session management function, SMF, that is to configure the first NF, and the information about the first NF received in the response from the NRF comprises an address of the SMF in the CN that is to configure the first NF.

47. A method as defined in statement 46, wherein said another NF is the SMF having the address indicated in the received response to the NF discovery request.

48. A method as defined in statement 45, wherein the NF discovery request requests an address for the first NF, and the information about the first NF received in the response from the NRF comprises an address of the first NF.

49. A method as defined in statement 48, wherein said another NF is the first NF having the address indicated in the received response to the NF discovery request.

50. A method as defined in statement 48 or 49, wherein the control service information further comprises a Tunnel Endpoint ID, TEID, of the first NF.

51. A method as defined in any of statements 45-50, wherein the control information further comprises:
   a routing indication comprising routing information and/or a routing profile for data traffic; and
   a default routing indication comprising routing information for uplink data traffic that does not match the indicated value for the indicated type of filter.

52. A method as defined in statement 51, wherein the control information further comprises a downlink routing indication that indicates a radio access node in a radio access network, RAN, of the communication network for downlink data traffic for the UE.

53. A method as defined in any of statements 45-50, wherein the control information further comprises:
   quality of service, QoS, information for data traffic.

54. A method as defined in any of statements 45-53, wherein the method further comprises:
   receiving a response to the control request from said another NF.

55. A method as defined in any of statements 45-48 wherein the method by the NEF further comprises, prior to the step of sending the NF discovery request to the NRF:
   receiving a traffic influence request from an application function, AF, in the CN, wherein the traffic influence request comprises traffic influence information comprising:
      the indication of the type of filter to be used by the first NF to selectively route uplink data traffic from a UE to a particular session anchor NF; and
      the indication of the value for the indicated type of filter; and
   sending a response to the traffic influence request to the AF.

56. A method as defined in statement 55, wherein the traffic influence information further comprises:
   a routing indication comprising routing information and/or a routing profile for data traffic; and
   a default routing indication comprising routing information for uplink data traffic that does not match the indicated value for the indicated type of filter.

57. A method as defined in statement 56, wherein the traffic influence information further comprises a downlink routing indication that indicates a radio access node in a radio access network, RAN, of the communication network for downlink data traffic for the UE.

58. A method as defined in statement 55, wherein the traffic influence information further comprises:
   quality of service, QoS, information for data traffic.

59. A method by an application function, AF, in a core network, CN, of a communication network for configuring a first network function, NF, wherein the first NF is to selectively route uplink data traffic in one or more data sessions from a user equipment, UE, to one of a plurality of session anchor NFs, wherein the method by the AF comprises:
   sending a traffic influence request to a network exposure function, NEF, in the CN, wherein the traffic influence request comprises traffic influence information comprising:
      an indication of a type of filter supported by the first NF to selectively route uplink data traffic from a UE to a particular session anchor NF; and
      an indication of a value for the indicated type of filter; and
   receiving a response to the traffic influence request from the NEF.

60. A method as defined in statement 59, wherein the traffic influence information further comprises:
   a routing indication comprising routing information and/or a routing profile for data traffic; and
   a default routing indication comprising routing information for uplink data traffic that does not match the indicated value for the indicated type of filter.

61. A method as defined in statement 60, wherein the traffic influence information further comprises a downlink routing indication that indicates a radio access node in a radio access network, RAN, of the communication network for downlink data traffic for the UE.

62. A method as defined in statement 59, wherein the traffic influence information further comprises:
   quality of service, QoS, information for data traffic.

63. A method by a first network function, NF, in a core network, CN, of a communication network for selectively routing uplink data traffic in one or more data sessions from a user equipment, UE, to one of a plurality of session anchor NFs, wherein the method by the first NF comprises:
   registering the first NF at a network repository function, NRF, of the CN according to the method in any of statements 1-6;
   configuring the first NF according to the method in any of statements 23-29;
   receiving data traffic from a UE via a radio access network, RAN, of the communication network;
   using a filter according to indicated type having the indicated value to selectively route the received data traffic from the UE to a particular session anchor NF.

64. A method implemented in a communication network including a host computer, a user equipment, UE, a base station, a core network, CN, comprising a first network function, NF, for selectively routing uplink data traffic in one or more data sessions from UEs to one of a plurality of session anchor NFs, wherein the method comprises:
   at the host computer, receiving data traffic transmitted from the UE via the base station, the first NF and a particular session anchor NF, wherein the first NF selectively routes the data traffic according to an indication of a type of filter to be used by the first NF and an indication of a value for the indicated type of filter.

65. A method as defined in statement 64, further comprising:
   at the UE, providing the data traffic to the base station.

66. A method as defined in statement 65, further comprising:
   at the UE, executing a client application, thereby providing the data traffic to be transmitted; and
   at the host computer, executing a host application associated with the client application.

67. A method as defined in statement 66, further comprising:
   at the UE, executing a client application; and at the UE, receiving input data to the client application, the input data being provided at the host computer by executing a host application associated with the client application, wherein the data traffic to be transmitted is provided by the client application in response to the input data.

68. A computer program product comprising a computer readable medium having computer readable code embodied therein, the computer readable code being configured such that, on execution by a suitable computer, processor or processing circuitry, the computer, processor or processing circuitry is caused to perform the method of any of statements 1-67.

69. A first network function, NF, for use in a core network, CN, of a communication network, wherein the first NF is for registering at a network repository function, NRF, of the CN, wherein the first NF is to selectively route uplink data traffic in one or more data sessions from a user equipment, UE, to one of a plurality of session anchor NFs, wherein the first NF comprises processing circuitry configured to:

send a registration request to the NRF, wherein the registration request comprises registration information comprising:

an indication of a type of filter supported by the first NF to selectively route uplink data traffic from a UE to a particular session anchor NF; and an indication of a value for the indicated type of filter.

Various embodiments of the first NF are also contemplated corresponding to method statements 2-6.

70. A network repository function, NRF, for use in a core network, CN, of a communication network, wherein the NRF is for registering a first network function, NF, that is to selectively route uplink data traffic in one or more data sessions from a user equipment, UE, to one of a plurality of session anchor NFs, wherein the NRF comprises processing circuitry configured to:

receive a registration request from the first NF, wherein the registration request comprises registration information comprising:

an indication of a type of filter supported by the first NF to selectively route uplink data traffic from a UE to a particular session anchor NF; and an indication of a value for the indicated type of filter.

Various embodiments of the NRF are also contemplated corresponding to method statements 8-14.

71. A session management function, SMF, for use in a core network, CN, of a communication network, wherein the SMF is for associating with a first network function, NF, that is to selectively route uplink data traffic in one or more data sessions from a user equipment, UE, to one of a plurality of session anchor NFs, wherein the SMF comprises processing circuitry configured to:

receive an association request from the first NF to associate the first NF with the SMF, wherein the association request comprises association information comprising:

an indication of a type of filter supported by the first NF to selectively route uplink data traffic from a UE to a particular session anchor NF; and an indication of a value for the indicated type of filter.

Various embodiments of the SMF are also contemplated corresponding to method statements 16-22.

72. A first network function, NF, for use in a core network, CN, of a communication network, wherein the first NF is to selectively route uplink data traffic in one or more data sessions from a user equipment, UE, to one of a plurality of session anchor NFs, wherein the first NF comprises processing circuitry configured to:

receive a control request from another NF in the CN, wherein the control request comprises control information that comprises:

an indication of a type of filter to be used by the first NF to selectively route uplink data traffic from a UE to a particular session anchor NF; and an indication of a value for the indicated type of filter.

Various embodiments of the first NF are also contemplated corresponding to method statements 24-30.

73. A session management function, SMF, for use in a core network, CN, of a communication network, wherein the SMF is for configuring a first network function, NF, that is to selectively route uplink data traffic in one or more data sessions from a user equipment, UE, to one of a plurality of session anchor NFs, wherein the SMF comprises processing circuitry configured to:

receive a traffic management request from a network exposure function, NEF, in the CN, wherein the traffic management request comprises traffic management information comprising:

an indication of a type of filter to be used by the first NF to selectively route uplink data traffic from a UE to a particular session anchor NF; and an indication of a value for the indicated type of filter; and send a control request to the first NF, wherein the control request comprises control information comprising:

the indication of the type of filter to be used by the first NF to selectively route uplink data traffic from a UE to a particular session anchor NF; and the indication of the value for the indicated type of filter.

Various embodiments of the SMF are also contemplated corresponding to method statements 32-39.

74. A network repository function, NRF, for use in a core network, CN, of a communication network, wherein the NRF is for configuring a first network function, NF, that is to selectively route uplink data traffic in one or more data sessions from a user equipment, UE, to one of a plurality of session anchor NFs, wherein the NRF comprises processing circuitry configured to:

receive a NF discovery request from a network exposure function, NEF, in the CN that requests information about the first NF, wherein the NF discovery request comprises NF discovery information comprising:

an indication of a type of filter supported by the first NF to selectively route uplink data traffic from a UE to a particular session anchor NF; and an indication of a value for the indicated type of filter; and send, to the NEF, a response to the NF discovery request indicating the information about the first NF.

Various embodiments of the NRF are also contemplated corresponding to method statements 41-44.

75. A network exposure function, NEF, for use in a core network, CN, of a communication network, wherein the NEF is for configuring a first network function, NF, that is to selectively route uplink data traffic in one or more data sessions from a user equipment, UE, to one of a plurality of session anchor NFs, wherein the NEF comprises processing circuitry configured to:

send a NF discovery request to a network repository function, NRF, in the CN that requests information about the first NF, wherein the NF discovery request comprises NF discovery information comprising:

an indication of a type of filter supported by the first NF to selectively route uplink data traffic from a UE to a particular session anchor NF; and an indication of a value for the indicated type of filter;

receive, from the NRF, a response to the NF discovery request indicating the information about the first NF; and send a control request to another NF in the CN, wherein the control request comprises control information that comprises:

the indication of the type of filter supported by the first NF to selectively route uplink data traffic from a UE to a particular session anchor NF; and the indication of the value for the indicated type of filter.

Various embodiments of the NEF are also contemplated corresponding to method statements 46-58.

76. An application function, AF, for use in a core network, CN, of a communication network, wherein the AF is for configuring a first network function, NF, wherein the first NF is to selectively route uplink data traffic in one or more data sessions from a user equipment, UE, to one of a plurality of session anchor NFs, wherein the AF comprises processing circuitry configured to:

send a traffic influence request to a network exposure function, NEF, in the CN, wherein the traffic influence request comprises traffic influence information comprising:

an indication of a type of filter to be used by the first NF to selectively route uplink data traffic from a UE to a particular session anchor NF; and an indication of a value for the indicated type of filter; and receive a response to the traffic influence request from the NEF.

Various embodiments of the AF are also contemplated corresponding to method statements 60-62.

77. A first network function, NF, for use in a core network, CN, of a communication network, wherein the first NF is to selectively route uplink data traffic in one or more data sessions from a user equipment, UE, to one of a plurality of session anchor NFs, wherein the first NF comprises processing circuitry configured to:

register the first NF at a network repository function, NRF, of the CN according to the statement 70, or any embodiment thereof;

configure the first NF according to statement 72, or any embodiment thereof;

receive data traffic from a UE via a radio access network, RAN, of the communication network;

use a filter according to indicated type having the indicated value to selectively route the received data traffic from the UE to a particular session anchor NF.

78. A communication network including a host computer, a user equipment, UE, a base station, a core network, CN, comprising a first network function, NF, for selectively routing uplink data traffic in one or more data sessions from UEs to one of a plurality of session anchor NFs, wherein the communication network is configured to:

at the host computer, receive data traffic transmitted from the UE via the base station, the first NF and a particular session anchor NF, wherein the first NF selectively routes the data traffic according to an indication of a type of filter to be used by the first NF and an indication of a value for the indicated type of filter.

Various embodiments of the communication network are also contemplated corresponding to method statements 65-67.

The invention claimed is:

1. A method by a user plane function, UPF, in a core network, CN, of a communication network for registering the UPF at a network repository function, NRF, of the CN, wherein the UPF is to selectively route uplink data traffic in one or more data sessions from a user equipment, UE, to one of a plurality of session anchor network functions, NFs, wherein the method by the UPF comprises:

sending a registration request to the NRF, wherein the registration request comprises registration information comprising:

an indication of a type of filter supported by the UPF to selectively route uplink data traffic from a UE to a particular session anchor NF, wherein the type of filter relates to an application identity; and an indication of a value for the indicated type of filter.

2. The method according to claim 1, wherein the registration information further comprises an identity for the UPF and an address for the UPF.

3. The method according to claim 1, wherein the type of filter further relates to any one or more of: a subnetwork identity, an address prefix, and a location.

4. The method according to claim 1, wherein the method further comprises:

sending an association request to a session management function, SMF, to associate the UPF with the SMF, wherein the association request comprises association information comprising the indication of the type of filter supported by the UPF and the indication of the value for the indicated type of filter.

5. The method according to claim 1, further comprising:

receiving a control request from another NF in the CN, wherein the control request comprises control information that comprises an indication of a type of filter to be used by the UPF to selectively route uplink data traffic from a UE to a particular session anchor NF, wherein the type of filter relates to an application identity; and an indication of a value for the indicated type of filter; and enabling a filter at the UPF, configured according to the control information, and selecting routing data traffic according to the enabled filter.

6. The method according to claim 5, wherein the control information further comprises:

a routing indication comprising routing information and/or a routing profile for data traffic; and a default routing indication comprising routing information for uplink data traffic that does not match the indicated value for the indicated type of filter.

7. The method according to claim 6, wherein the control information further comprises a downlink routing indication that indicates a radio access node in a radio access network, RAN, of the communication network for downlink data traffic for the UE.

8. The method according to claim 5, wherein the control information further comprises quality of service, QoS, information for data traffic.

9. The method according to claim 5, wherein the control information further comprises a Tunnel Endpoint ID, TEID, of the UPF.

10. A method by a network repository function, NRF, in a core network, CN, of a communication network for registering a user plane function, UPF, that is to selectively route uplink data traffic in one or more data sessions from a user equipment, UE, to one of a plurality of session anchor network functions, NFs, wherein the method by the NRF comprises:
   receiving a registration request from the UPF, wherein the registration request comprises registration information comprising:
      an indication of a type of filter supported by the UPF to selectively route uplink data traffic from a UE to a particular session anchor NF, wherein the type of filter relates to an application identity; and
      an indication of a value for the indicated type of filter.

11. The method according to claim 10, wherein the method further comprises storing the received registration information.

12. The method according to claim 10, wherein the method further comprises receiving an update request from a session management function, SMF, wherein the update request comprises update information comprising the indication of the type of filter supported by the UPF and the indication of the value for the indicated type of filter.

13. The method according to claim 12, wherein the update information further comprises an identity for the SMF.

14. The method according to claim 10, further comprising:
   receiving a NF discovery request from a network exposure function, NEF, in the CN that requests information about the UPF, wherein the NF discovery request comprises NF discovery information comprising:
      an indication of a type of filter supported by the UPF to selectively route uplink data traffic from a UE to a particular session anchor NF, wherein the type of filter relates to an application identity; and
      an indication of a value for the indicated type of filter; and
   sending, to the NEF, a response to the NF discovery request indicating the information about the UPF.

15. The method according to claim 14, wherein the information about the UPF sent in the response to the NEF comprises an address of a session management function, SMF, in the CN that is to configure the UPF.

16. The method according to claim 14, wherein the information about the UPF sent in response to the NEF comprises an address of the UPF.

17. A method by a session management function, SMF, in a core network, CN, of a communication network for associating with a user plane function, UPF, that is to selectively route uplink data traffic in one or more data sessions from a user equipment, UE, to one of a plurality of session anchor network functions, NFs, wherein the method by the SMF comprises:
   receiving an association request from the UPF to associate the UPF with the SMF, wherein the association request comprises association information comprising:
      an indication of a type of filter supported by the UPF to selectively route uplink data traffic from a UE to a particular session anchor NF, wherein the type of filter relates to an application identity; and
      an indication of a value for the indicated type of filter.

18. The method according to claim 17, wherein the association information further comprises an identity for the UPF.

19. The method according to claim 17, wherein the method further comprises storing the received association information.

20. A method by a network exposure function, NEF, in a core network, CN, of a communication network for configuring a user plane function, UPF, wherein the UPF is to selectively route uplink data traffic in one or more data sessions from a user equipment, UE, to one of a plurality of session anchor network functions, NFs, wherein the method by the NEF comprises:
   sending a NF discovery request to a network repository function, NRF, in the CN that requests information about the UPF, wherein the NF discovery request comprises NF discovery information comprising:
      an indication of a type of filter supported by the UPF to selectively route uplink data traffic from a UE to a particular session anchor NF, wherein the type of filter relates to an application identity; and
      an indication of a value for the indicated type of filter;
   receiving, from the NRF, a response to the NF discovery request indicating the information about the UPF; and
   sending a control request to another NF in the CN, wherein the control request comprises control information that comprises:
      the indication of the type of filter supported by the UPF to selectively route uplink data traffic from a UE to a particular session anchor NF; and
      the indication of the value for the indicated type of filter.

21. The method according to claim 20, wherein the NF discovery request requests an address for a session management function, SMF, that is to configure the UPF, and the information about the UPF received in the response from the NRF comprises an address of the SMF in the CN that is to configure the UPF.

22. The method according to claim 20, wherein said another NF is the SMF having the address indicated in the received response to the NF discovery request.

23. The method according to claim 20, wherein the NF discovery request requests an address for the UPF, and the information about the UPF received in the response from the NRF comprises an address of the UPF.

24. The method according to claim 23, wherein said another NF is the UPF having the address indicated in the received response to the NF discovery request.

25. The method according to claim 20, wherein the method by the NEF further comprises, prior to the step of sending the NF discovery request to the NRF:
   receiving a traffic influence request from an application function, AF, in the CN, wherein the traffic influence request comprises traffic influence information comprising:
      the indication of the type of filter to be used by the UPF to selectively route uplink data traffic from a UE to a particular session anchor NF; and
      the indication of the value for the indicated type of filter; and
   sending a response to the traffic influence request to the AF.

* * * * *